US012377675B2

(12) United States Patent
Larina et al.

(10) Patent No.: US 12,377,675 B2
(45) Date of Patent: Aug. 5, 2025

(54) PERSONALIZABLE MULTI-COLOUR SECURITY FEATURES

(71) Applicant: THALES DIS FRANCE SAS, Meudon (FR)

(72) Inventors: Nina Larina, Carnoux-en-Provence (FR); Jarmo Nikkila, Vantaa (FI); Stefan Egli, Uster (CH); Jean-Luc Lesur, Bras (FR)

(73) Assignee: THALES DIS FRANCE SAS, Meudon (FR)

( * ) Notice: Subject to any disclaimer, the term of this patent is extended or adjusted under 35 U.S.C. 154(b) by 0 days.

(21) Appl. No.: 18/552,233

(22) PCT Filed: Mar. 25, 2022

(86) PCT No.: PCT/EP2022/057996
§ 371 (c)(1),
(2) Date: Sep. 25, 2023

(87) PCT Pub. No.: WO2022/200605
PCT Pub. Date: Sep. 29, 2022

(65) Prior Publication Data
US 2024/0165985 A1 May 23, 2024

(30) Foreign Application Priority Data
Mar. 26, 2021 (EP) .................................... 21305380

(51) Int. Cl.
*B42D 25/41* (2014.01)
*B42D 25/387* (2014.01)

(52) U.S. Cl.
CPC ........... *B42D 25/41* (2014.10); *B42D 25/387* (2014.10)

(58) Field of Classification Search
CPC .............................. B42D 25/41; B42D 25/387
USPC ........ 283/67, 70, 72, 87, 88, 89, 90, 91, 92, 283/94, 98, 901
See application file for complete search history.

(56) References Cited

U.S. PATENT DOCUMENTS

2012/0049506 A1* 3/2012 Nikkila ................. B42D 25/43 283/85

FOREIGN PATENT DOCUMENTS

EP 2424735 B1 12/2014
WO 2018109035 A2 6/2018

OTHER PUBLICATIONS

International Search Report (PCT/ISA/210) and Written Opinion (PCT/ISA/237) mailed on Aug. 29, 2022, by the European Patent Office as the International Searching Authority for current International Application No. PCT/EP2022/057996—[12 pages].

* cited by examiner

*Primary Examiner* — Justin V Lewis

(57) ABSTRACT

Provided is a data carrier (1) extending along an extension direction (E) comprises at least one first colour element (2), wherein the first colour element (2) exhibits an appearance under a first illumination and/or exhibits an appearance under a second illumination being different from the first illumination, at least one second colour element (3), wherein the second colour element (3) exhibits an appearance under the first illumination being different from the appearance of the first colour element (2) under the first illumination and/or exhibits an appearance under the second illumination that is different from the appearance of the first colour element (2) under the second illumination.

14 Claims, 14 Drawing Sheets

Under Day Light

Under UV Light

Under Day Light

3 Colors columns viewed

Under UV Light

Negative black personalization pattern viewed

Under Day Light

3 Colors columns viewed

Under UV Light full fluo Uv ink viewed

PERSONALIZABLE MULTI-COLOUR SECURITY FEATURES

TECHNICAL FIELD

The present invention relates to a data carrier comprising at least one security element according to claim 1, to a security document comprising or consisting of such a data carrier according to claim 13, and to a method of producing a data carrier according to claim 14.

BACKGROUND

Data carriers comprising one or more security elements find a wide application. For example, they are used in or as security documents such as driving licenses, identity cards, membership cards, passports, banking cards, etc. Such data carriers or security documents are generally personalized, i.e. they comprise personalized information such as personal data of the owner of the data carrier or the security document, for example a photograph, a name, a birth date, a social security number, biometric information such as a fingerprint, or official information such as a national coat of arms, a validity date, etc. Because of the value and importance associated with these data carriers or security documents, they are often subject of unauthorized manipulations such as forgery.

Several solutions regarding a protection against unauthorized manipulations of such data carriers are known in the prior art. For instance, EP 2424735 proposes usage of a transparent ablation varnish under a standard fluorescent ink, and wherein the ink layer is ablated along with the varnish by the irradiation of electromagnetic radiation. US 2012/0091704 A1 discloses a multilayer structure within security documents, where a special effect ink layer is placed inside the structure and covered with upper layers hiding its appearance. Physical micro-holes are then in the upper layers to reveal the special effect inside or at the bottom of the holes. A disadvantage of this approach relates to the breaking of the integrity of the sealed document body. US2008/0124498 A1 discloses that fluorescent marks can be produced by lasers if marking certain conventional pigments, via generating some fluorescent products upon pigment decomposition. However, the fluorescent products are insufficiently stable under UV aging conditions and the marking is limited in fluorescence intensity, for example.

SUMMARY

It is an object of the present invention to overcome the drawbacks of the prior art. In particular, it is an object to provide a data carrier having an improved security against unauthorized manipulations.

This object is achieved with a data carrier according to claim 1. In particular, a data carrier extending along an extension direction is provided, wherein the data carrier comprises at least one first colour element, at least one second colour element, and at least one personalization element. The first colour element exhibits an appearance under a first illumination and/or exhibits an appearance under a second illumination being different from the first illumination. The second colour element exhibits an appearance under the first illumination being different from the appearance of the first colour element under the first illumination and/or exhibits an appearance under the second illumination that is different from the appearance of the first colour element under the second illumination. For example, and as will be explained in greater detail further below, the first colour element could correspond to an offset ink that is visible under an illumination being in the visible range of the electromagnetic spectrum, e.g. under daylight. However, the first colour element could likewise correspond to a luminescent such as a fluorescent ink that is visible under an illumination being in the ultraviolet region of the electromagnetic spectrum. Likewise, the second colour element could correspond to an offset ink that is visible under the illumination being in the visible range of the electromagnetic spectrum or to a luminescent such as a fluorescent ink that is visible under the illumination being in the ultraviolet region of the electromagnetic spectrum. However, an appearance of the first colour element and the second colour element under the first illumination and/or the second illumination is different. For example, if the first and second colour elements correspond to offset inks, one of the colour elements could correspond to red offset ink and the other colour element could correspond to green offset ink. Another example would be first and second colour elements being fluorescent inks, however again of different colours. Another example would be a first colour element being an offset ink and the second colour element being a fluorescent ink, et cetera. Moreover, and as will also be explained in greater detail below, the personalization element could correspond to a mark such as an opaque mark or a coloured mark or a bleached mark or an ablated mark or a transparent mark.

The first colour element and the second colour element are arranged staggered with respect to the extension direction. A staggered arrangement means that one colour element is arranged before the other colour element with respect to the extension direction. In other words, the first and second colour elements are not arranged at a same height or horizontal location in the data carrier if the extension direction is defined as a vertical direction. The data carrier furthermore comprises at least one security element. The security element at least partially comprises the first colour element, the second colour element and the personalization element. The security element exhibits a first appearance under the first illumination and a second appearance being different from the first appearance under the second illumination. In other words, the security element exhibits a multiple visibility, for example a dual visibility, under different illumination conditions. A security of the data carrier is thereby enhanced.

The first appearance of the security element preferably comprises or consists of the appearance of the first colour element and possibly also of the personalization element and/or possibly also of the second colour element under the first illumination. Additionally or alternatively the second appearance of the security element preferably comprises or consists of the appearance of the second colour element and possibly also of the personalization element and/or possibly also of the first colour element under the second illumination.

The first colour element and/or the second colour element is preferably configured to reflect impinging electromagnetic radiation, whereby a reflection spectrum is generated. It is however likewise preferred that the first colour element and/or the second colour element is configured to emit an emission spectrum upon an irradiation with electromagnetic radiation. In the former case it is preferred that the first and/or second colour element corresponds to offset ink. In the latter case it is preferred that the first and/or second colour element corresponds to ultraviolet ink. Moreover, in the former case the appearance of the security element is preferably generated according to the subtractive colour mixing scheme as it is known in the art. In the latter case the appearance of the security element is preferably generated according to the additive colour mixing scheme as it is known in the art.

The personalization element can be configured and/or arranged to affect the first colour element and/or the second colour element and/or the appearance of the first colour element under the first illumination and/or the appearance of the first colour element under the second illumination and/or the appearance of the second colour element under the second illumination. For example, the personalization element could directly affect the first colour element and/or the second colour element, wherein a direct affection could be provided by a personalization element that at least partially removes or bleaches or blackens etc. the first colour element and/or the second colour element. The personalization element can however likewise be configured to indirectly affect the first colour element and/or the second colour element, wherein an indirect affection could be provided by a personalization element in the form of a mark such as an opaque or transparent mark that at least partially blocks or allows electromagnetic radiation being incident on the data carrier to progress towards the first colour element and/or the second colour element and/or that at least partially blocks or allows electromagnetic radiation being yielded (e.g. reflected or emitted) from the first colour element and/or the second colour element to progress towards an outside of the data carrier.

The personalization element is preferably at least partially overlapping the first colour element and/or the second colour element with respect to the extension direction. In other words, when seen along the vertical direction the personalization element can be arranged at least partially above or below the first colour element and/or the second colour element. Additionally or alternatively, the personalization element is preferably arranged at least partially offset to the first colour element and/or the second colour element with respect to the extension direction. In other words, when seen along the vertical direction the personalization element can be arranged at least partially spaced apart from the first colour element and/or the second colour element. Additionally or alternatively, the personalization element is preferably at least partially overlapping the first colour element and/or the second colour element with respect to at least a transverse direction extending perpendicularly to the extension direction. In other words, the personalization element can be arranged at least partially at the location of the first colour element and/or the second colour element. For example, and as already mentioned above, it is conceivable that the personalization element directly affects the first colour element and/or the second colour element by at least partially removing or bleaching or blackening it, whereby the personalization element is at least partially overlapping the first colour element and/or the second colour element with respect to the transverse direction. Additionally or alternatively, the personalization element is preferably arranged at least partially offset to the first colour element and/or the second colour element with respect to at least a transverse direction extending perpendicularly to the extension direction. In other words, the personalization element can be arranged at least partially spaced apart from the first colour element and/or the second colour element when seen along a horizontal direction running perpendicularly to the vertical direction.

The first colour element can be arranged before the second colour element with respect to the extension direction and the personalization element can be arranged before the first colour element or between the first and second colour element or after the second colour element with respect to the extension direction. In other words, when seen along the vertical direction, the first colour element can be arranged above the second colour element. Additionally, the personalization element can be arranged above both colour elements or below both colour elements or between the colour elements. Alternatively, the second colour element can be arranged before the first colour element with respect to the extension direction and the personalization element can be arranged before the second colour element or between the second and first colour element or after the first colour element with respect to the extension direction. In other words, when seen along the vertical direction, the second colour element can be arranged above the first colour element. Additionally, the personalization element can be arranged above both colour elements or below both colour elements or between the colour elements.

The personalization element can be generated from a processing element. The processing element can be configured to alter its appearance upon irradiation of electromagnetic radiation, whereby the personalization element is generated at the location of the irradiation. Alternatively, the processing element preferably together with at least part of the first colour element and/or of the second colour element can be configured to be removed upon irradiation of electromagnetic radiation, whereby the personalization element is generated at the location of the irradiation. In particular, the processing element can correspond to a C-doped layer and/or to one or more polymers such as thermoplastic polymers and in particular to polycarbonate and/or to thermal ink. In this case it is preferred that the personalization element corresponds to an opaque mark that is generated upon an irradiation of electromagnetic radiation on the processing element. An opaque mark could be a black mark or grey levels mark, for example. However, it is likewise conceivable that the processing element corresponds to a one or more pigments. In this case it is preferred that the personalization element corresponds to a bleaching that is generated upon an irradiation of electromagnetic radiation on the processing element. It is also conceivable that the processing element corresponds to a thermochromic and/or photochromics ink. In this case it is preferred that the personalization element corresponds to a colour change that is generated upon an irradiation of electromagnetic radiation on the processing element. It is also conceivable that the processing element corresponds to one or more pigments and/or photochromic ink and/or thermochromic ink. In this case it is preferred that the personalization element corresponds to a transparency change that is generated upon an irradiation of electromagnetic radiation on the processing element. It is furthermore conceivable that the processing element corresponds to a varnish and/or ink with metallic particles, the varnish and/or ink with metallic particles is preferably configured to be ablated upon irradiation with electromagnetic radiation. In this case the personalization element preferably corresponds to an ablation that is generated upon an irradiation of electromagnetic radiation on the processing element. It is furthermore preferred that the varnish is transparent. In other words, the personalization element preferably corresponds to a laser personalization. It should be noted that the data carrier can comprise only one processing element or two or more processing elements. Said two or more processing elements can be the same or different from one another. Consequently, it is conceivable that the data carrier comprises only one type of personalization elements, e.g. only opaque marks in the event that only a C-doped layer or a polycarbonate or thermal ink is used. By providing two or more different processing elements, two or more different types of personalization elements can be generated. Hence, the data carrier enables different types of laser personalizations. Furthermore, these different types of personalizations can be generated by applying different settings of the laser being used to generate the personalizations. The components constituting the processing element preferably correspond to commercially available components that are well-known in the art.

The first colour element preferably comprises or consists of standard ink and/or offset ink. For example, the first colour element can correspond to standard ink or offset ink of a first colour. In other words, the first colour element can be configured to absorb electromagnetic radiation being in the visible region of the electromagnetic spectrum. Again in other words, the appearance of the first colour element yielded under the first illumination can comprise or consist of electromagnetic radiation being reflected from the first colour element. Additionally or alternatively the first colour element can comprise or consist of a fluorescent ink. That is, the first colour element could likewise correspond to a fluorescent ink of a first colour. Hence, the first colour element can be configured to absorb electromagnetic radiation being in the ultraviolet region of the electromagnetic spectrum and to thereafter emit electromagnetic radiation upon its relaxation. The appearance of the first colour element yielded under the second illumination can therefore comprise or consist of electromagnetic radiation being emitted from the first colour element. Additionally or alternatively, the second colour element can comprise or consist of a fluorescent ink. That is, the second colour element could correspond to a fluorescent ink of a second colour being different from the first colour associated with the first colour element being a fluorescent ink. The second colour element is preferably configured to absorb electromagnetic radiation being in the ultraviolet region of the electromagnetic spectrum. The appearance of the second colour element yielded under the second illumination can therefore comprise or consist of electromagnetic radiation being emitted from the second colour element. To this end it is preferred that the second colour element does not reflect and/or emit electromagnetic radiation under the first illumination.

The first colour element could be provided as a layer that extends along a transverse direction running perpendicularly to the extension direction. Likewise, the second colour element could be provided as a layer that extends along a transverse direction running perpendicularly to the extension direction. Likewise, the processing element could be provided as a layer that extends at least partially along a transverse direction running perpendicularly to the extension direction.

The security element can have the shape of an image and/or of an alphanumeric character. Non-exhaustive examples of an image are a portrait e.g. of the holder of the data carrier, an outline of a country, a state coat of arms, a state flag, etc. Non-exhaustive examples of an alphanumeric character are a date of birth e.g. of the holder of the data carrier, an expiry date, etc. Hence, the first and second colour elements and the personalization element are preferably arranged and/or configured such that the security element appears in the shape of an image and/or of an alphanumeric character.

The first colour element and the second colour element can be arranged at a distance from one another with respect to the extension direction. Alternatively, the first colour element and the second colour element can be arranged immediately adjacent to one another with respect to the extension direction. For example, the first colour element and the second colour element could correspond to layers that are arranged on top of one another or which are spaced apart from one another with respect to the extension direction. In the latter case it is conceivable that one or more further elements such as a plastic layer, for example a polymer layer and/or a transparent layer, is arranged between the layer of the first colour element and the layer of the second colour element.

The data carrier preferably comprises one or more further first colour elements. Said one or more further first colour elements can be arranged at least along a transverse direction extending perpendicularly to the extension direction. The data carrier preferably comprises one or more further second colour elements. Said one or more further second colour elements can be arranged at least along a transverse direction extending perpendicularly to the extension direction. The data carrier preferably comprises one or more further personalization elements. Said one or more further personalization elements can be arranged at least along a transverse direction extending perpendicularly to the extension direction. As mentioned earlier, the transverse direction can also be seen as the horizontal direction, and wherein the horizontal direction runs perpendicularly to the vertical direction mentioned above. A horizontal plane running perpendicularly to the extension direction can thus be defined. Said horizontal plane is spanned by the transverse direction (or the horizontal direction) mentioned above and a further transverse direction (or a further horizontal direction) running perpendicularly to the extension direction as well as perpendicularly to the transverse direction (or the horizontal direction). It is furthermore preferred that the first colour elements and/or the second colour elements and/or the personalization elements are arranged along the horizontal plane. In other words, the first colour elements and/or the second colour elements and/or the personalization element preferably at least partially cover a surface area. The first colour elements, i.e. the first colour element and the one or more further first colour elements, can be arranged immediately adjacent to one another with respect to the transverse direction and/or with respect to the further transverse direction. Alternatively, it is conceivable that the first colour elements are arranged at a distance from one another with respect to the transverse direction and/or with respect to the further transverse direction. Likewise, the second colour elements, i.e. the second colour element and the one or more further second colour elements, can be arranged immediately adjacent to one another with respect to the transverse direction and/or the further transverse direction or the second colour elements can be arranged at a distance from one another with respect to the transverse direction and/or the further transverse direction. Furthermore, the appearance of the first colour elements under the first illumination can be at least partially the same or at least partially different from one another. For example, all first colour elements can correspond to a standard ink or offset ink of the same colour. Alternatively, one or more of the first colour elements can correspond to a standard ink or an offset ink being of a different colour. Alternatively, one or more first colour elements could correspond to a standard ink or an offset ink and one or more first colour elements could correspond to an UV ink colour. Likewise, the appearance of the first colour elements under the second illumination can be at least partially the same or at least partially different from one another. For example, all first colour elements can be of a same UV ink colour. Alternatively, at least some of the first colour elements can be UV inks of different colours. Likewise, the appearance of the second colour elements under the second illumination can be at least partially the same or at least partially different from one another. For example, all second colour elements can be of the same UV ink colour or at least some of the second colour elements can be UV ink of different colours. The first colour elements and/or the second colour elements can also in this case be provided as layers. The same applies to the personalization element, which can be provided as a layer as well, e.g. by means of a processing layer that is configured to alter its appearance upon irradiation of electromagnetic radiation or a varnish layer that is configured to be ablated or removed upon irradiation of electromagnetic radiation.

The first colour elements can be arranged as a pattern, preferably as a pixelated pattern comprising or consisting of pixelated first colour elements. Additionally or alternatively, the second colour elements can be arranged as a pattern, preferably as a pixelated pattern comprising or consisting of pixelated second colour elements. Additionally or alternatively, the personalization elements can be arranged as a pattern, preferably as pixelated pattern comprising or consisting of pixelated personalization elements. Various designs of the pattern are conceivable. For example, the pattern comprising the first colour elements and/or the second colour elements could be of a regular or irregular design. For example, the pattern could be a line pattern comprising several lines, and wherein said lines are of a same geometry such as a same thickness or length or of a different geometry. Another example involves a line pattern whose lines are of different colours, etc. The same applies to the personalization elements, which can likewise be provided in the form of a regular or irregular pattern. A pixelated first colour element is understood as a first colour element defining a surface area and/or having a particular geometrical extension. Likewise, a pixelated second colour element is understood as a second colour element defining a surface area and/or having a particular geometrical extension. Likewise, a pixelated personalization element is understood as a personalization element defining a surface area and/or having a particular geometrical extension. Said surface area or geometrical extension preferably has a minimal spatial extension. In other words, a pixelated first colour element and/or pixelated second colour element preferably defines an area having a specific shape that could be divided in pixels for the personalization of the data carrier. To this end one pixel up to any desired number of pixel can be defined. Furthermore, the particular area or shape or geometrical extension or minima spatial dimension is particularly preferably determined by the resolution of the print size in the event of first and second colour elements being printed. Within the context of the present invention the expression "personalization of the data carrier" is understood as generating one or more personalization elements. The minimal spatial extension of the pixelated personalization element is preferably defined by a processing device such as a laser that is used to generate the personalization elements, i.e. the pixels. In the case of a laser, the spatial extension of a pixel is in the range of about 1 micrometer to 500 micrometer, more preferably in the range of about 50 micrometer to 100 micrometer. Additionally or alternatively in the event that the personalization element is generated with the laser it is furthermore preferred that a laser pixel is considered as one dot, i.e. one dot made with the laser.

At least one first colour element and/or at least one second colour element and/or at least one personalization element are preferably aligned according to a selected alignment with respect to one another and with respect to the extension direction and/or with respect to a transverse direction extending perpendicularly to the extension direction. Being aligned means that the first colour element(s) and/or the second colour element(s) and/or the personalization element(s) are arranged in a desired spatial relationship to one another. It should be noted that said selected alignment could of course also be with respect to the further transverse direction. Said selected alignment or desired spatial relationship is preferably such that a particular first appearance and/or second appearance of the security element under the first illumination and/or the second illumination is achieved. For example, the first appearance and/or the second appearance could correspond to a first colour impression and/or a second colour impression of the security element under the first illumination and/or the second illumination, and wherein the first colour impression differs from the second colour impression. Additionally or alternatively, the first appearance and/or the second appearance could furthermore correspond to a first spatial impression and/or a second spatial impression under the first illumination and/or the second illumination, and wherein the first spatial impression differs from the second spatial impression. Said particular colour impressions and/or spatial impressions can be achieved in various ways. For instance, one or more first colour elements being standard ink, followed by one or more personalization element(s) such as opaque marks that selectively cover a particular colour of second colour elements being provided as a fluorescent RGB grid. With respect to the extension direction the first colour elements are arranged before the personalization elements which in turn are arranged before the second colour elements. As a consequence, when seen under the first illumination being visible light such as daylight, for example, the security element would exhibit the first colour elements and the opaque marks. When seen under the second illumination being UV light, for example, the security element would exhibit the (uncovered) second colour elements and the opaque marks. As another example, it is conceivable to provide with respect to the extension direction second colour elements in the form of UV fluorescent ink, followed by first colour elements in the form of standard ink or offset ink, which first colour elements are in turn followed by personalization elements in the form of opaque marks. Hence, under the first illumination being visible light such as daylight the security element appears as the first colour elements and the opaque marks. Under the second illumination being UV light the security element appears as the UV fluorescent second colour elements. However, and as just mentioned, various ways of generating a particular appearance of the security element are conceivable. In fact, further ways could lie in the extinction of selected colour elements, e.g. by providing a processing element in the form of a varnish that is followed, with respect to the extension direction, by second colour elements in the form of fluorescent UV ink, and wherein the varnish is selectively ablated together with the fluorescent UV ink at the location of the ablation. Another way could lie in the at least partial extinction of one or more particular colours of a RGB fluorescent pattern or the like, e.g. 50% of red and 50% of green of a fluorescent RGB grid could be covered with opaque marks in order to generate in average a blue colour when the data carrier is observed under UV illumination. Hence, the selected alignment of the first colour element(s) and/or the second colour elements and/or the personalization element(s) can be such, that the security element appears under a first colour impression and/or under a first spatial impression under the first illumination, and/or that the security element appears under a second colour impression and/or under a second spatial impression under the second illumination.

To this end it is particularly preferred that the first colour element(s) correspond to pixelated first colour element(s) and/or that the second colour element(s) correspond to pixelated second colour element(s) and/or that the personalization element(s) correspond to pixelated personalization element(s), and wherein the pixelated first colour element(s) and/or the pixelated second colour element(s) and/or the pixelated personalization element(s) are aligned according to a selected alignment with respect to one anther and with respect to the extension direction and/or with respect to the transverse direction. It is furthermore preferred that one or more pixelated first colour elements and one or more pixelated second colour elements are arranged above one another with respect to the extension direction. In other words it is preferred that the one or more pixelated first colour elements are arranged congruent with one or more pixelated second colour elements with respect to the extension direction. Again in other words, the surface area and/or the geometrical extension associated with the pixelated first and second colour elements are preferably the same. Again in other words, one or more pixelated first colour elements and one or more pixelated second colour elements are preferably arranged at a same horizontal location within the data carrier when seen along the extension direction. It is particularly preferred that a pixelated pattern comprising the first colour elements and a pixelated pattern comprising the second colour elements are arranged congruent to one another and with respect to the extension direction. It is furthermore preferred that one or more personalization elements are provided in alignment with one or more pixelated first colour elements and/or with one or more pixelated second colour elements. In other words, a personalization of the data carrier by providing one or more personalization elements preferably affects one or more of the aligned pixelated first colour elements and second colour elements.

It is furthermore preferred that the first appearance and/or the second appearance of the security element depends from an angle of observation under which an observer observed the data carrier. In other words, an appearance of the security element could change when the data carrier is observed under a same illumination however under different angles of observation, i.e. when the data carrier is tilted. In this regard it is preferred that the first colour element(s) and/or the second colour element(s) and/or the personalization element(s) are arranged and/or configured such that the appearance of the security element is optimized with respect to one or more particular angles of observations. An optimization could be achieved by a particular spacing between the colour element(s) and/or the personalization element(s) with respect to the extension direction and/or by a particular size of the pixelated personalization element(s) and/or by the particular alignment, etc.

At least one first colour element and/or at least one second colour element and/or at least one personalization element are aligned with respect to one another and with respect to the extension direction and/or with respect to the transverse direction according to a further selected alignment, wherein the further selected alignment is preferably different from the selected alignment. Here again it should be noted that said further selected alignment could likewise be with respect to the further transverse direction. The further selected arrangement preferably results in the security feature exhibiting a further first appearance under the first illumination and/or a further second appearance being different from the further first appearance under the second illumination. Moreover, the further first appearance can be the same as or different from the first appearance. Likewise, the further second appearance can be the same as or different from the second appearance. It is particularly preferred that at least one of the first appearance and the further first appearance or the second appearance and the further second appearance differ from one another.

The one or more first colour elements and/or the one or more second colour elements and/or the one or more personalization elements participating in the alignment are preferably different from the one or more first colour elements and/or the one or more second colour elements and/or the one or more personalization elements participating in the further alignment. Said difference is preferably associated with a different spatial arrangement within the data carrier. The different spatial arrangement is particularly preferably with regard to the transverse direction and/or the further transverse direction. That is, the elements participating in the alignment are preferably arranged at a horizontal location within the data carrier that differs from a horizontal location of the elements participating in the further alignment. Again in other words, the elements participating in the alignment are preferably not congruent with the elements participating in the further alignment with respect to the extension direction. Said difference is preferably furthermore associated with the provision of different personalization elements, e.g. personalization elements that are arranged and/or configured to affect one or more of the first colour elements and/or one or more of the second colour elements differently. For example, second colour elements in the form of a pixelated UV fluorescent ink pattern could be arranged before the first colour elements in the form of a pixelated standard ink pattern with respect to the extension direction. Furthermore, in a first alignment the personalization elements could be arranged and/or configured such that the first colour elements participating in the first alignment appear under the first illumination being provided by daylight and that the second colour elements participating in the first alignment appear under the second illumination being provided by UV light. In a second alignment the personalization elements could be arranged and/or configured such, that the first colour elements participating in the second alignment appear under the first illumination being provided by daylight, however in a colour being different from the colour of the first colour elements participating in the first alignment. Additionally or alternatively, the personalization elements could be arranged and/or configured such, that the second colour elements participating in the second alignment appear under the second illumination, however in a colour being different from the colour of the second colour elements participating in the first alignment. It should be noted that these particular alignments are merely an example. In addition, the personalization elements participating in the first alignment and in the second alignment could be provided by means of opaque marks constituting an alphanumeric character and/or an image, and wherein said alphanumeric character and/or image appears under the first illumination and/or under the second illumination as well. In addition, the alphanumeric character and/or image being associated with the first alignment can be the same or different from the alphanumeric character and/or image being associated with the second alignment. It should be noted that this is one example for illustrative purposes only. Many other alignments and thus appearances of the security features are likewise conceivable. Important to note here is the fact that a selected further alignment being different from the alignment mentioned above can provide a security element that exhibits a first colour impression (provided by the alignment) and/or a further first colour impression (provided by the further alignment) and/or a first spatial impression (provided by the alignment) and/or a further first spatial impression (provided by the further alignment) under the first illumination, and/or in a security element that exhibits a second colour impression (provided by the alignment) and/or a further second colour impression (provided by the further alignment) and/or a second spatial impression (provided by the alignment) and/or a further second spatial impression (provided by the further alignment) under the second illumination. Or, in simplified terms, a security element comprising a first partial security element being constituted by the alignment and a further partial security element being constituted by the further alignment can be generated. It should be noted that two or more such further alignments can be provided.

It should be noted that the data carrier can comprise one or more further first colour elements and/or one or more further second colour elements and/or one or more further personalization elements that are arranged along the extension direction. For example, the data carrier could comprise two or more layers of first colour elements and/or two or more layers of second colour elements and/or two or more layers of processing elements comprising personalization elements that are arranged above one another with respect to the extension direction. Explanations made herein with regard to the first colour elements, the second colour elements and the personalization elements being arranged with regard to the transverse direction likewise apply to these elements being arranged with regard to the extension direction. For example, said layers of first and second colour elements being arranged along the extension direction could correspond to pixelated patterns, etc. It should also be noted that the data carrier can comprise two or more security elements. In addition, the data carrier preferably comprises a card body or a data page of a passport as it is known in the art. A conceivable card body or data page comprises or consists of different layers of plastic, particularly preferably opaque and/or transparent plastic. It is furthermore preferred that one or more of these layers additionally comprise one or more prints to constitute an artwork base drawing with guilloches and/or other secure print elements as they are known in the art.

In a further aspect a security document comprising or consisting of a data carrier as described above is provided. The security document preferably is an identity card, a passport, a credit card, a bank note or the like.

Any explanations provided with respect to the data carrier per se likewise apply to the security document and vice versa.

In a further aspect a method of producing a data carrier extending along an extension direction is provided. Said preferably a data carrier is preferably a data carrier as described above. The method comprises the steps of i) providing at least one first colour element, ii) providing at least one second colour element, iii) providing at least one personalization element, and iv) providing at least one security element.

The first colour element exhibits an appearance under a first illumination and/or exhibits an appearance under a second illumination being different from the first illumination. The second colour element exhibits an appearance under the first illumination being different from the appearance of the first colour element under the first illumination and/or exhibits an appearance under the second illumination that is different from the appearance of the first colour element under the second illumination. The first colour element and the second colour element are arranged staggered with respect to one another and with respect to the extension direction. The security element at least partially comprises the first colour element, the second colour element and the personalization element. The security element exhibits a first appearance under the first illumination and a second appearance being different from the first appearance under the second illumination.

It should be noted that any explanations provided with respect to the data carrier per se or the security document likewise apply to the method and vice versa.

It should furthermore be noted that the steps i) and ii) can be performed in arbitrary order. However, it is preferred that step iii) regarding the provision of the personalization element is preferably performed after the provision of the colour elements, i.e. after steps i) and ii) To this end it is particularly preferred that the provision of the personalization element results in the generation of the security element.

The personalization element is preferably generated by irradiating electromagnetic radiation onto the data carrier. At least one further personalization element is preferably formed by irradiating further electromagnetic radiation onto the data carrier. The electromagnetic radiation and the further electromagnetic radiation can be the same or different from one another.

The electromagnetic radiation and the further electromagnetic radiation are preferably provided by a source of radiation such as a laser, e.g. an Infrared laser. Electromagnetic radiation and further electromagnetic radiation differing from one another could comprise different wavelengths, different laser powers, different focal points, different pulse durations, i.e. different laser parameters. Hence, the present invention allows the generation of two or more possibly different personalization elements using a same source of radiation, wherein merely the laser parameters and associated optics have to be adjusted.

BRIEF DESCRIPTION OF THE DRAWINGS

Preferred embodiments of the invention are described in the following with reference to the drawings, which are for the purpose of illustrating the present preferred embodiments of the invention and not for the purpose of limiting the same. In the drawings.

DESCRIPTION OF PREFERRED EMBODIMENTS

Figure 1A:
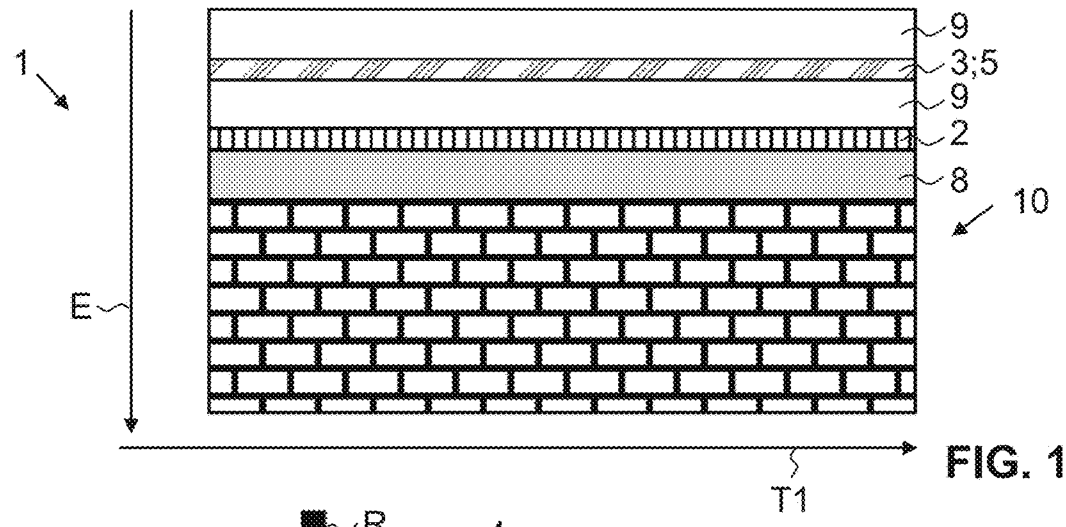
FIG. 1*a* shows a sectional view of a data carrier comprising a first colour element, a second colour element, and a first and second processing element in an unprocessed state.
Figure 1B:
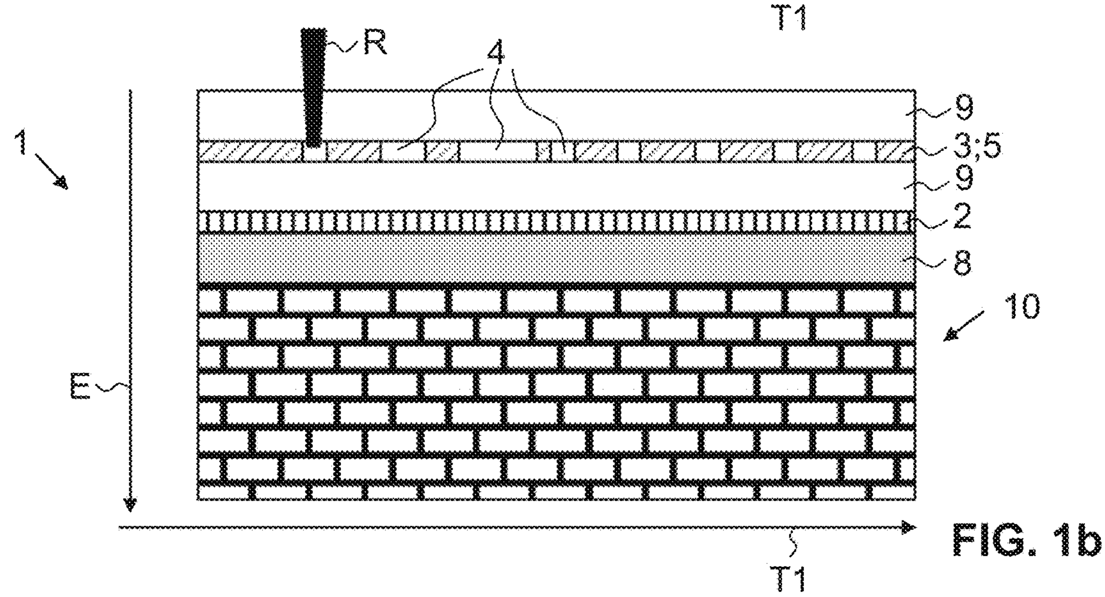
FIG. 1*b* shows a sectional view of the data carrier according to FIG. 1*a*, wherein the first processing element is processed so as to generate first personalization elements.
Figure 1C:
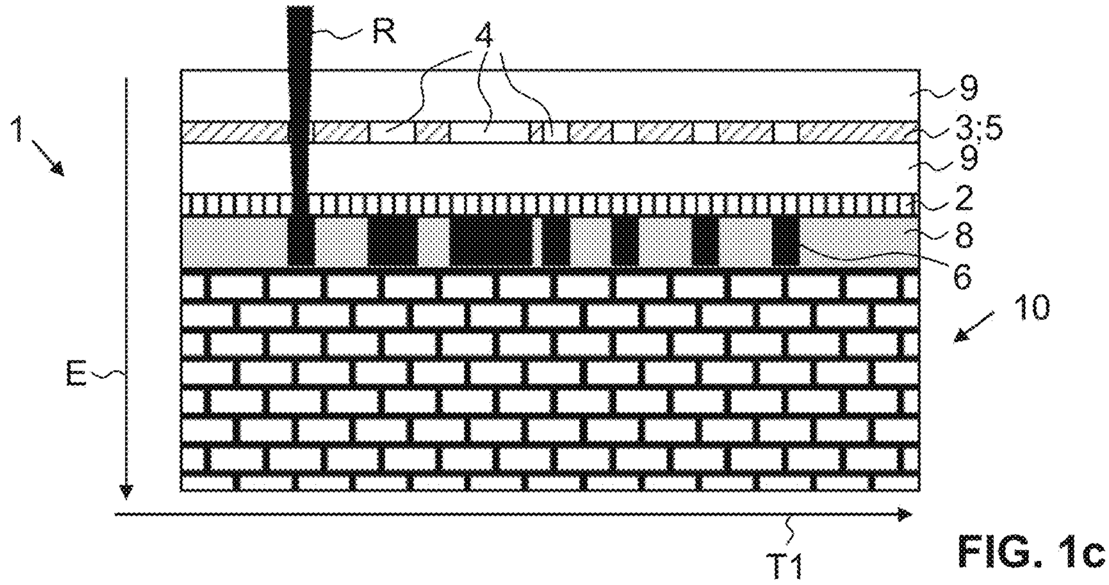
FIG. 1*c* shows a sectional view of the data carrier according to FIG. 1*b*, wherein the second processing element is processed so as to generate second personalization elements.
Figure 2A:
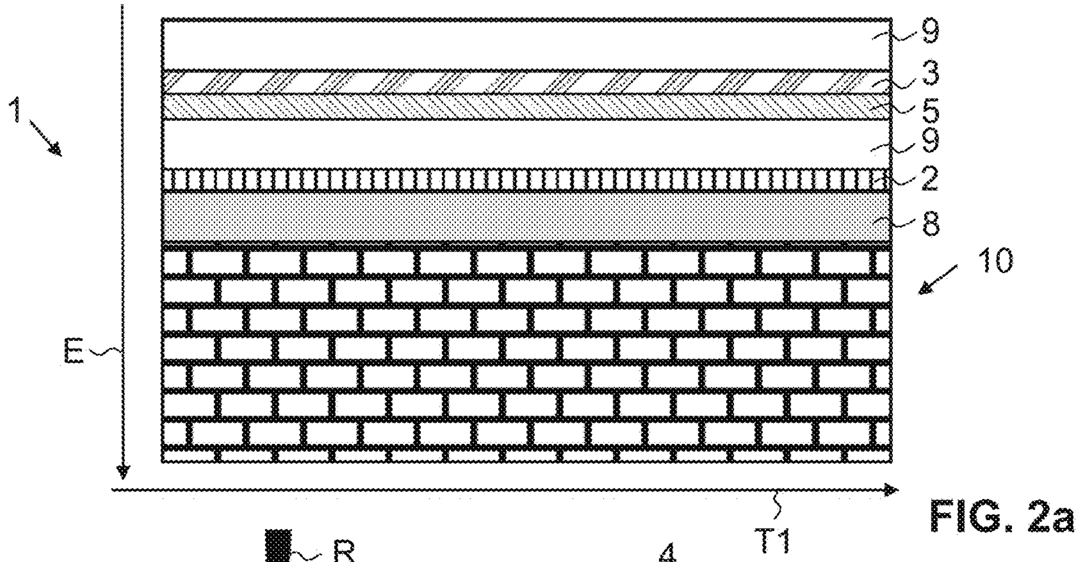
FIG. 2*a* shows a sectional view of another data carrier comprising a first colour element, a second colour element, and a first and second processing element in an unprocessed state.
Figure 2B:
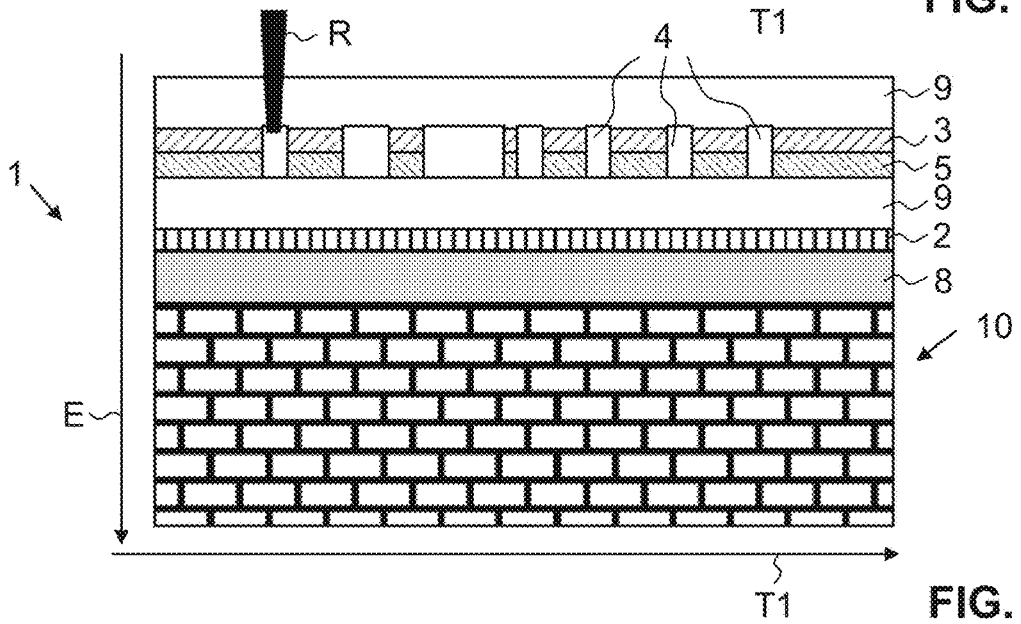
FIG. 2*b* shows a sectional view of the data carrier according to FIG. 2*a*, wherein the first processing element is processed so as to generate first personalization elements.
Figure 2C:
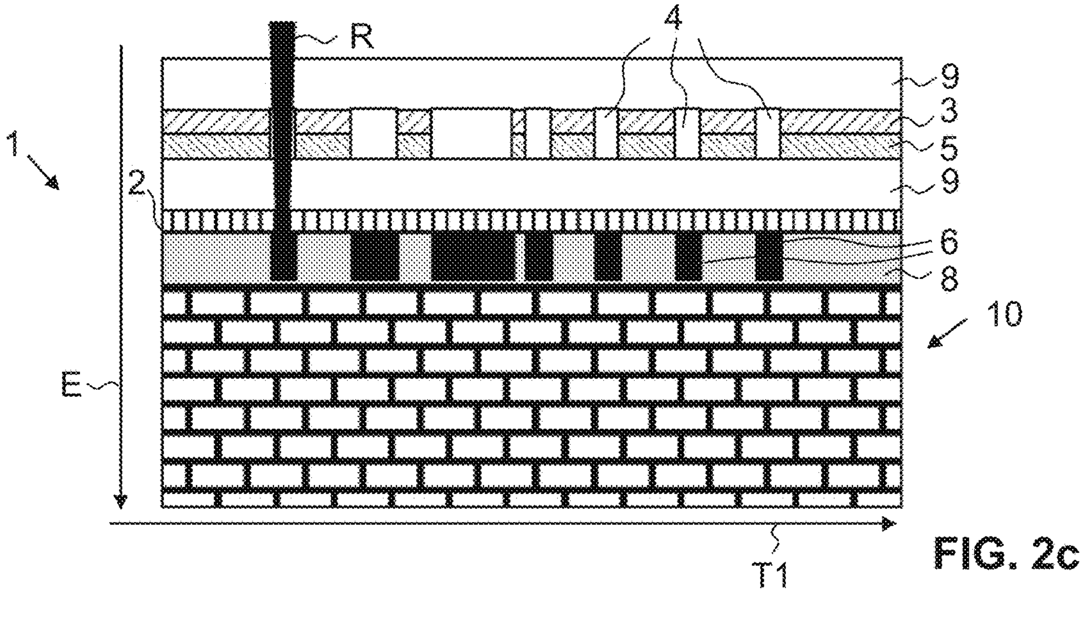
FIG. 2*c* shows a sectional view of the data carrier according to FIG. 2*b*, wherein the second processing element is processed so as to generate second personalization elements.
Figure 3A:
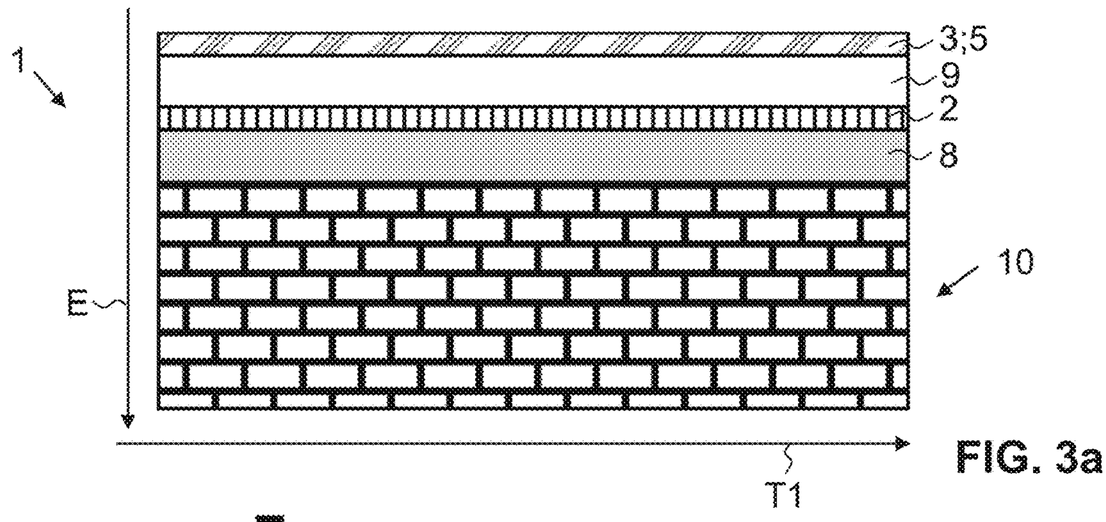
FIG. 3*a* shows a sectional view of another data carrier comprising a first colour element, a second colour element, and a first and second processing element in an unprocessed state.
Figure 3B:
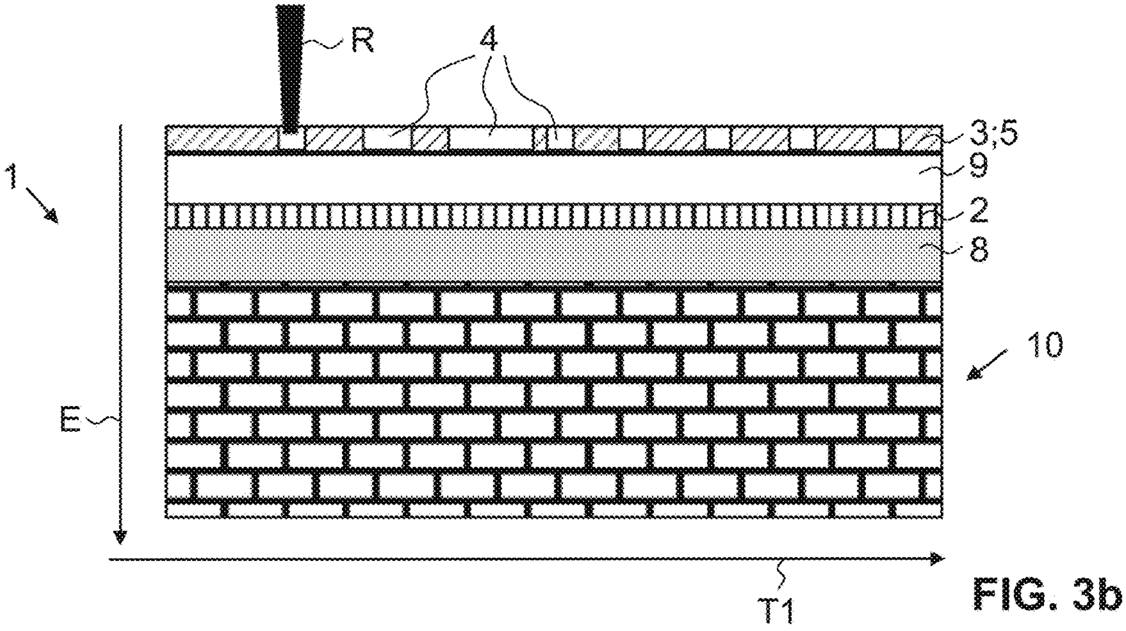
FIG. 3*b* shows a sectional view of the data carrier according to FIG. 3*a*, wherein the first processing element is processed so as to generate first personalization elements.
Figure 3C:
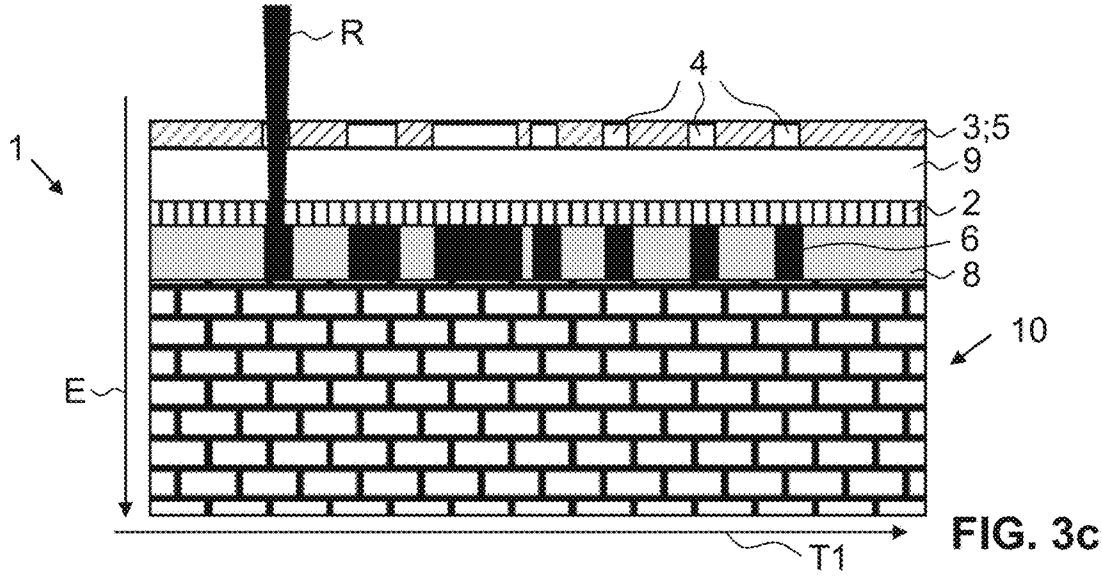
FIG. 3*c* shows a sectional view of the data carrier according to FIG. 3*b*, wherein the second processing element is processed so as to generate second personalization elements.
Figure 4A:
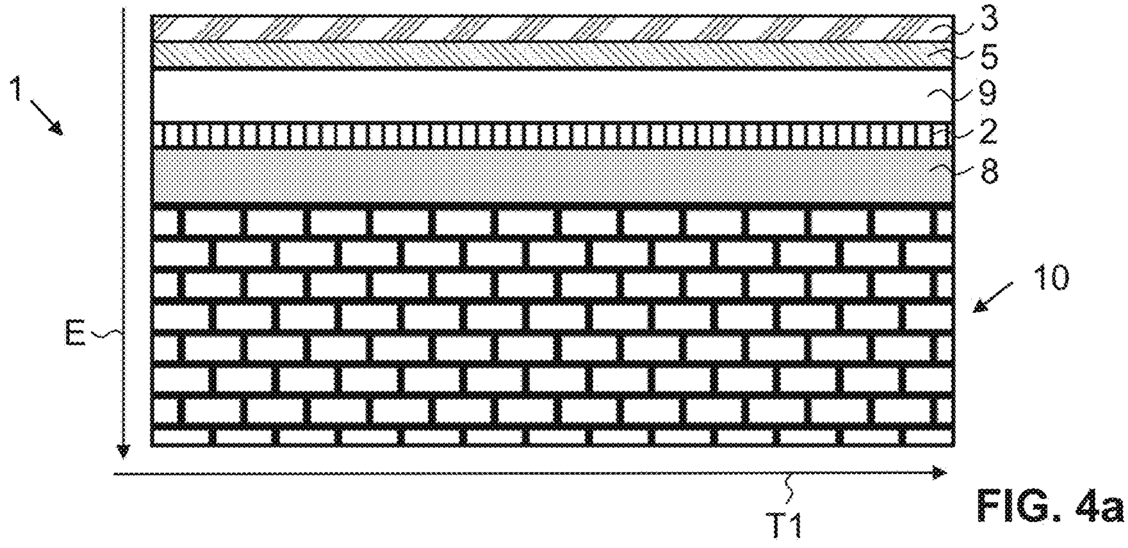
FIG. 4*a* shows a sectional view of another data carrier comprising a first colour element, a second colour element, and a first and second processing element in an unprocessed state.
Figure 4B:
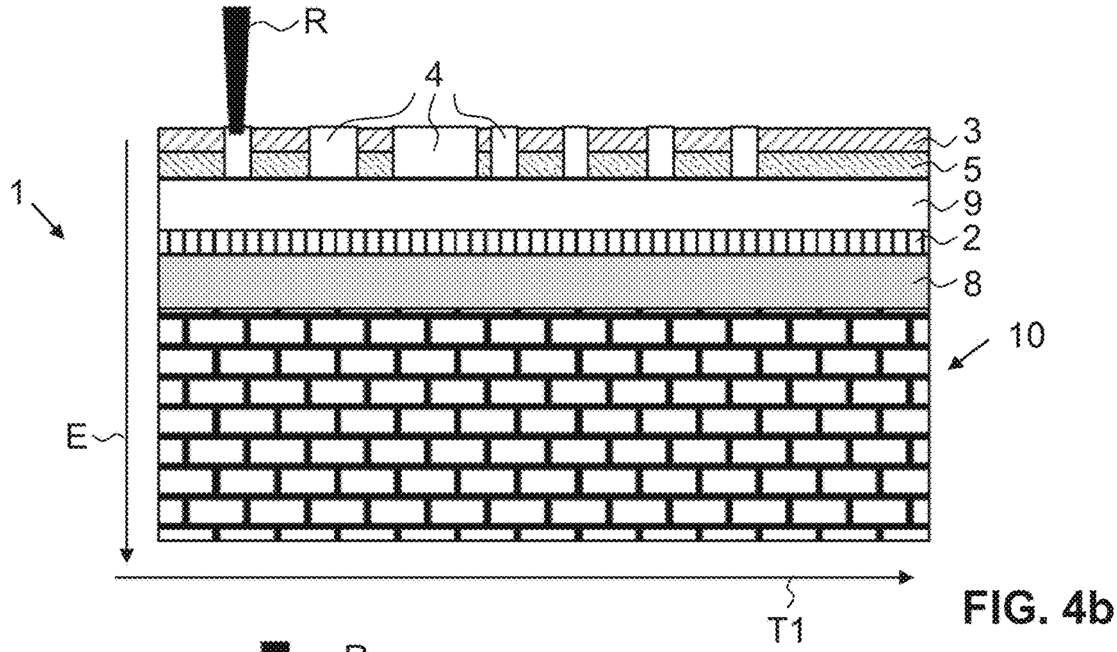
FIG. 4*b* shows a sectional view of the data carrier according to FIG. 4*a*, wherein the first processing element is processed so as to generate first personalization elements.
Figure 4C:
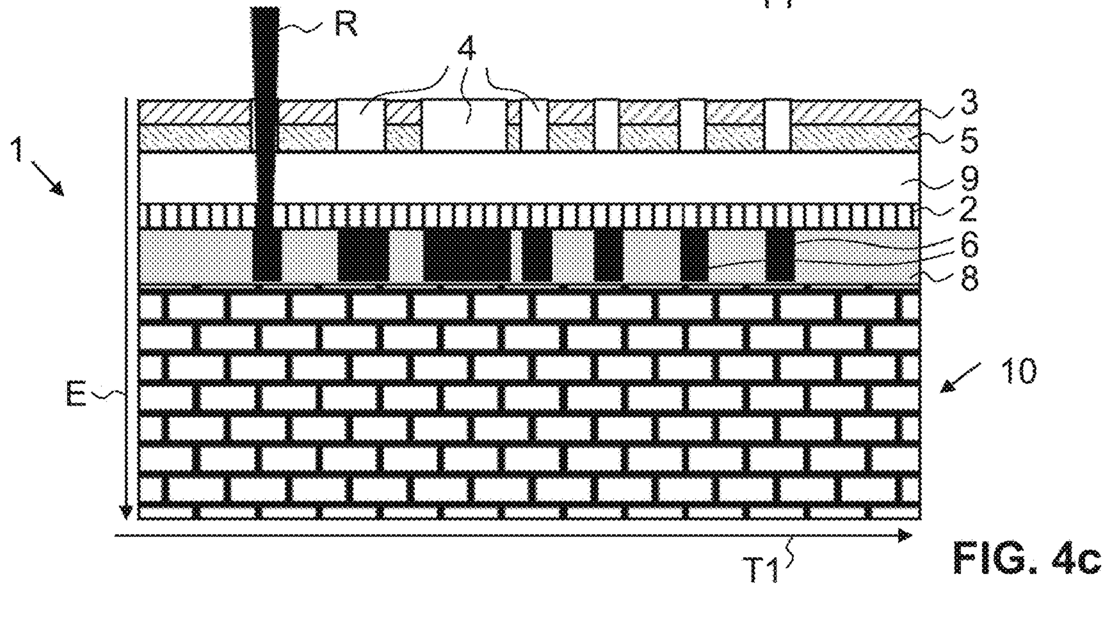
FIG. 4*c* shows a sectional view of the data carrier according to FIG. 4*b*, wherein the second processing element is processed so as to generate second personalization elements.
Figure 5:
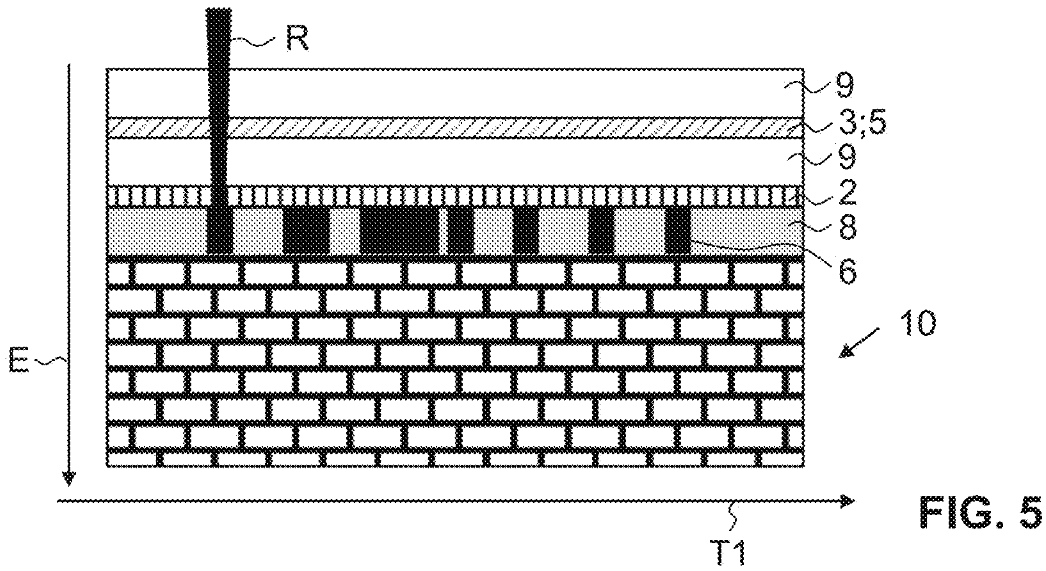
FIG. 5 shows a sectional view of another data carrier comprising a first colour element, a second colour element, and a processing element, wherein the processing element is processed so as to generate personalization elements.
Figure 6:
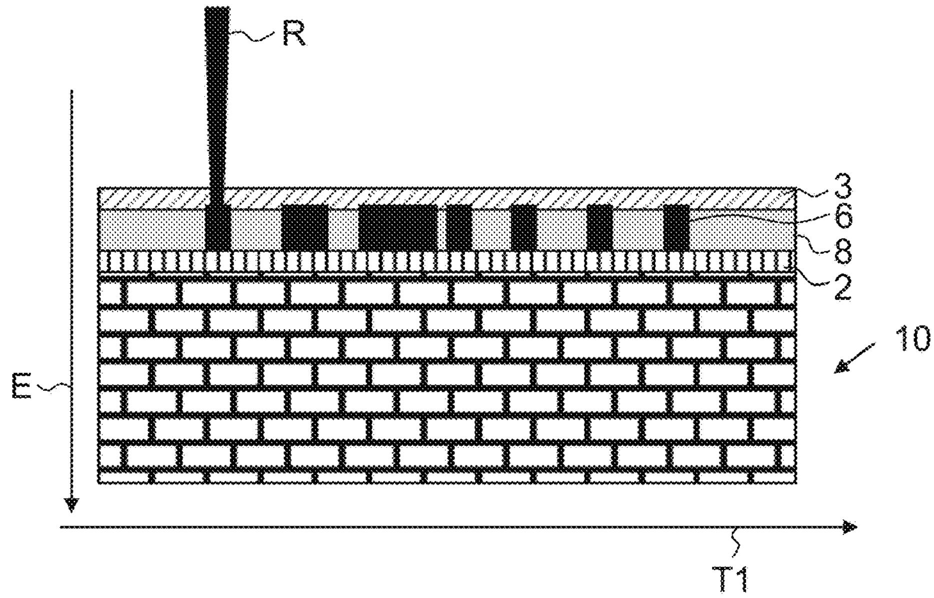
FIG. 6 shows a sectional view of another data carrier comprising a first colour element, a second colour element, and a processing element, wherein the processing element is processed so as to generate personalization elements.
Figure 7:
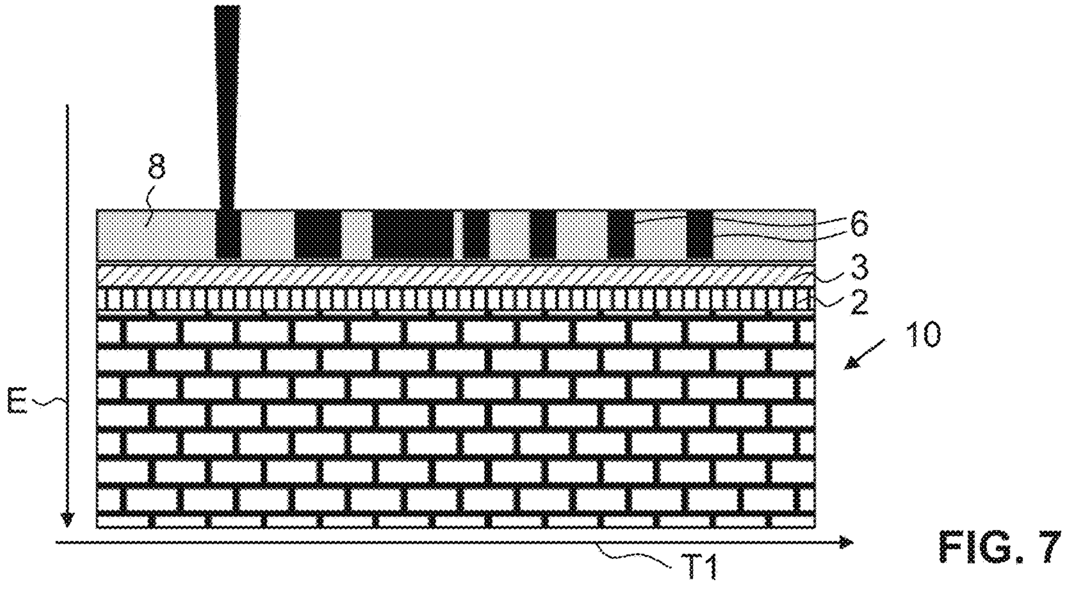
FIG. 7 shows a sectional view of another data carrier comprising a first colour element, a second colour element, and a processing element, wherein the processing element is processed so as to generate personalization elements.

Various aspects of a data carrier according to the invention shall now be described with reference to the figures.

As best seen in FIGS. 1*a* to 7, the data carrier 1 extends along an extension direction E and comprises at least one first colour element 2 and at least one second colour element 3. In the depicted examples said colour elements 2, 3 are provided as layers that extend along transverse directions T1, T2 extending perpendicularly to the extension direction E as well as perpendicularly to one another. Said extension direction E can also be defined as a vertical direction. The transverse directions T1, T2 can thus also be seen as horizontal directions, and wherein the horizontal direction runs perpendicularly to the vertical direction.

The first colour element 2 exhibits an appearance under a first illumination and/or exhibits an appearance under a second illumination being different from the first illumination. The second colour element 3 exhibits an appearance under the first illumination being different from the appearance of the first colour element 2 under the first illumination and/or exhibits an appearance under the second illumination that is different from the appearance of the first colour element 2 under the second illumination.

The data carrier 1 furthermore comprises one or more processing element 5, 8 that can be processed, whereby one or more personalization elements 4, 6 are generated. In the depicted examples the processing elements 5, 8 are provided in the form of layers extending along the transverse direction T1 and T2, as well. Furthermore, the processing elements 5, 8 are configured to be processed by electromagnetic radiation R that is irradiated onto the processing elements 5, 8. In FIGS. 1*a*, 2*a*, 3*a* and 4*a*, the data carriers 1 correspond to unprocessed or unpersonalized data carriers 1, i.e. their processing elements 5, 8 have not been processed or personalized yet. In FIGS. 1*b*, 2*b*, 3*b*, 4*b* and 5 to 7, one of the processing elements 5 is being processed or personalized by the irradiation of the electromagnetic radiation R, whereby personalization elements 4 are generated. In FIGS. 1*c*, 2*c*, 3*c*, and 4*c*, the other processing element 8 is additionally processed or personalized by the further irradiation of electromagnetic radiation R, whereby further personalization elements 6 are generated. As readily follows, the appearance of the processing elements 5, 8 alters upon the irradiation of the electromagnetic radiation R at the location of the irradiation.

The first colour element 2 and the second colour element 3 are arranged staggered with respect to the extension direction E. In fact, in FIGS. 1*a* to 7, the second colour element 3 is arranged before the first colour element 2 with respect to the extension direction E. In other words, the second colour element 3 is arranged on top of or above the first colour element 2. In other words, the first and second colour elements 2, 3 are not arranged at a same height in the data carrier 1 if the extension direction E is defined as a vertical direction.

In addition, the first colour element 2 and the second colour element 3 are arranged at a distance from one another with respect to the extension direction E, wherein one or more layers are arranged in between. In fact, in all depicted examples a transparent plastic layer 9 is arranged between the colour elements. In these examples, the data carrier 1 comprises further such transparent plastic layers 9, for example a transparent plastic layer 9 being arranged before the second colour element 3 and forming a top of the data carrier 1, see FIGS. 1*a* to 2*c* and 5. Moreover, in all of the depicted examples the data carrier 1 comprises a card body 10 as it is known in the art, i.e. a stack of layers common in the card industry, wherein said card body encompasses here the colour elements 2, 3 and the processing elements 5, 8 and the personalization elements 4, 6 as well as further layers such as the transparent layers made of plastics 9.

Furthermore, in FIGS. 1*a* to 1*c*, 3*a* to 3*c* and 5 the processing element 5 and the second colour element 3 are overlapping one another with respect to the extension direction E and the transverse directions T1, T2. In fact, the processing element 5 and the second colour element 3 are provided as a single layer. Consequently, the processing element 5 and the second colour element 3 are arranged offset to the first colour element 2 with respect to the extension direction E. In these examples, the processing element 5 corresponds to a varnish that comprises the second colour element 3 in the form of UV fluorescent ink. The varnish, i.e. the processing element 5 and the second colour element 3 are configured to be bleached or made transparent upon irradiation of electromagnetic radiation R, whereby the personalization element 4 in the form of said bleaching or transparency is generated at the location of the irradiation. In these figures the further processing element 8 corresponds to a C-doped layer that forms an opaque mark 6 upon an irradiation of electromagnetic radiation R, whereby the personalization element 6 in the form of an opaque mark is formed. Said further processing element 8 is arranged here after the first colour element 2 with respect to the extension direction E. Furthermore, in FIGS. 1*c*, 2*c*, 3*c* and 4*c* the personalization elements 4 in the form of the bleachings or transparencies and the personalization elements 6 in the form of the opaque marks are arranged congruent to one another and with respect to the extension direction E.

It furthermore follows from FIGS. 1*a* to 4*c* that the personalization of the data carrier 1, i.e. the generation of personalization elements 4, 6 in the processing element 5, 8, is achieved with electromagnetic radiation R originating from a same source of radiation, wherein merely the electromagnetic radiation R and the further electromagnetic radiation R are preferably provided by a source of radiation such as a laser, e.g. an Infrared laser. Electromagnetic radiation R and further electromagnetic radiation R differing from one another could comprise different wavelengths, different laser powers, different focal points, different pulse durations, i.e. different laser parameters. Hence, the present invention allows the generation of two or more possibly different personalization elements 4, 6 using a same source of radiation, wherein merely the laser parameters and associated optics are adjusted so as to achieve a different focal point in order to selectively reach the element of choice, for example either the varnish or the C-doped layer or both components at the same time. Hence, from these figures it becomes apparent that several different types of personalizations can be achieved with the present invention. For example, the varnish could be removed in a first type of personalization (FIGS. 1*b*, 2*b*, 3*b*, 4*b*), the varnish could be removed as well as opaque marks can be generated at the same time in a second type of personalization (see FIGS. 1*c*, 2*c*, 3*c*, 4*c*), or only opaque marks could be generated in a third type of personalization (see figures FIG. 5, 6, 7).

Figure 8A:
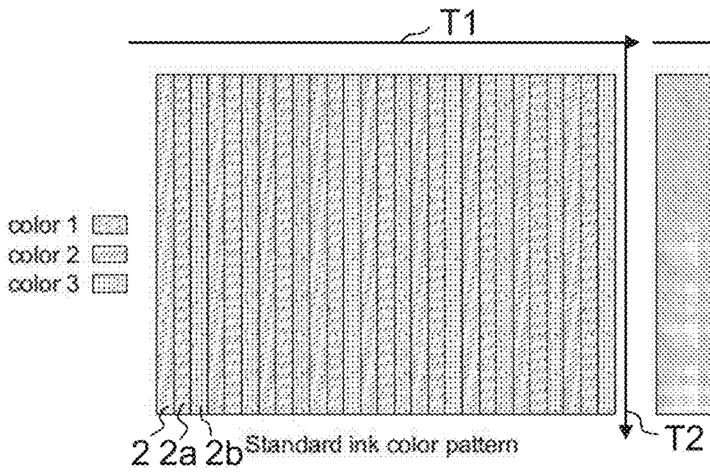
FIG. 8*a* depicts a top view on a layer of a standard ink colour pattern.
Figure 9A:
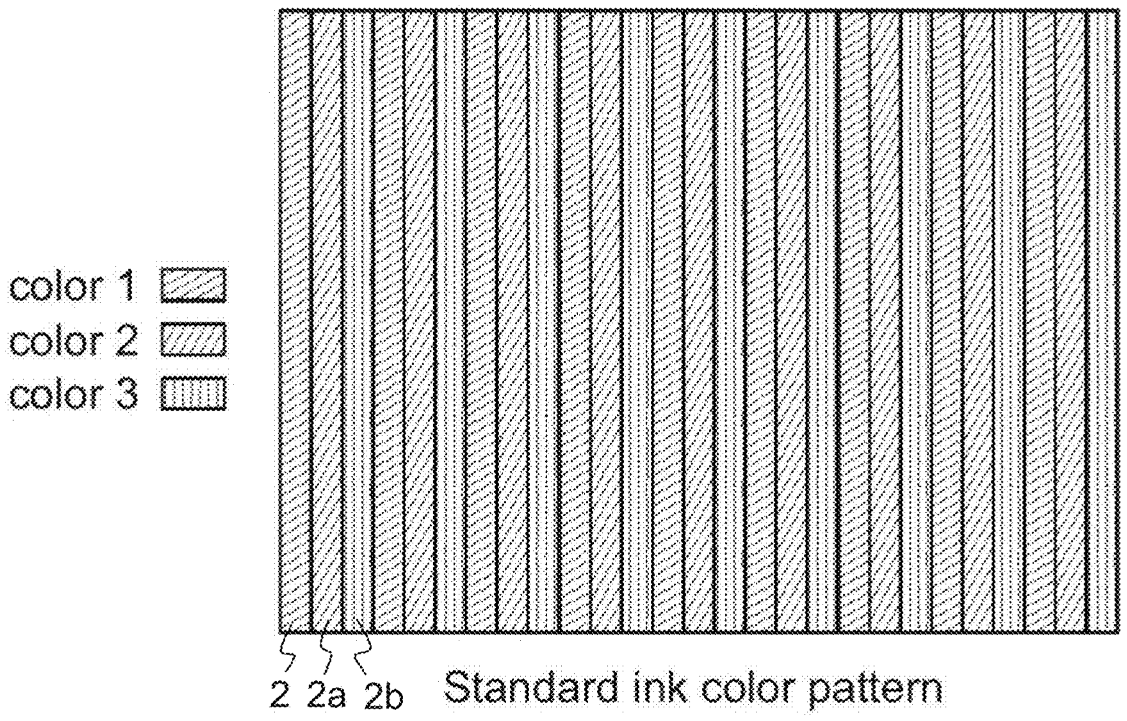
FIG. 9*a* depicts a top view on a layer of a standard ink colour pattern comprising three different standard ink colours.
Figure 9B:
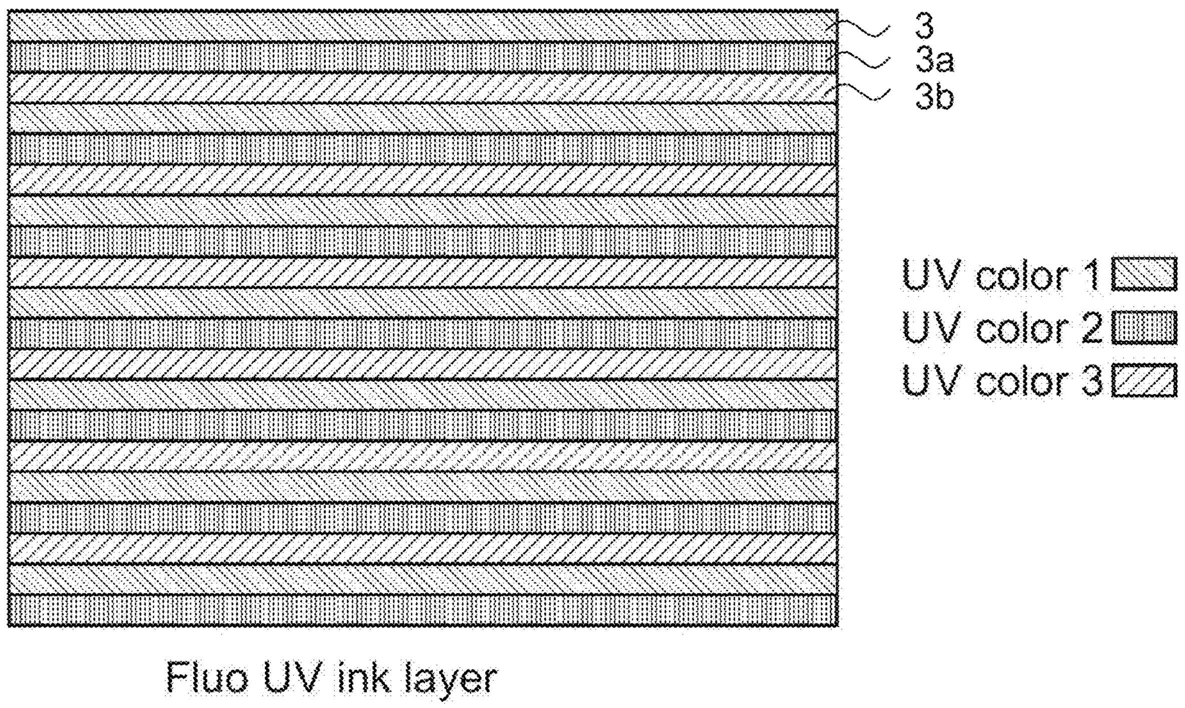
FIG. 9*b* depicts a top view on a layer of a fluorescent UV ink pattern comprising three different fluorescent UV ink colours.

As follows from FIGS. 8*a*, 9*a* and 9*b*, the data carrier 1 can comprise one or more further first colour elements 2*a*, 2*b*, . . . and/or one or more further second colour elements 3*a*, 3*b*, . . . , which are arranged along one or both of the transverse directions T1, T2. In fact, these first colour elements 2, 2*a*, 2*b*, . . . and second colour elements 3, 3*a*, 3*b*, . . . are arranged along a horizontal plane running perpendicularly to the extension direction E and cover a surface area. In the depicted examples, the first colour elements 2, 2*a*, 2*b*, . . . and the second colour elements 3, 3*a*, 3*b*, . . . are arranged immediately adjacent to one another with respect to the transverse direction T1, T2. Moreover, the appearance of the first colour elements 2, 2*a*, 2*b*, . . . and the appearance of the second colour elements 3, 3*a*, 3*b*, . . . are different from one another. In fact, in the present examples the first colour elements 2, 2*a*, 2*b*, . . . correspond to standard inks of different colours and the second colour elements 3, 3*a*, 3*b*, . . . correspond to UV fluorescent ink of different colours.

Furthermore, the first colour elements 2, 2*a*, 2*b*, . . . and the second colour elements 3, 3*a*, 3*b*, . . . are in each case arranged as a pattern, preferably a pixelated pattern consisting of pixelated first colour elements 2, 2*a*, 2*b*, . . . and pixelated second colour elements 3, 3*a*, 3*b*, . . . , see explanations provided below with reference to FIG. 9*c* and following.

One or more security elements 7 are formed by the first colour elements 2, 2*a*, 2*b*, . . . , the second colour elements 3, 3*a*, 3*b*, . . . , and the personalization elements 4, 4*a*, . . . 6, 6*a*, . . . , see FIGS. 8*a* to 9*n*. Said security elements 7 have here the shape of alphanumeric characters. The particular arrangement and/or configuration of the first colour elements 2, 2*a*, 2*b*, . . . , the second colour elements 3, 3*a*, 3*b*, . . . and the personalization elements 4, 4*a*, . . . 6, 6*a*, . . . , result in the generation of security elements 7 that exhibit different appearances or multiple visibilities.

Figure 8B:
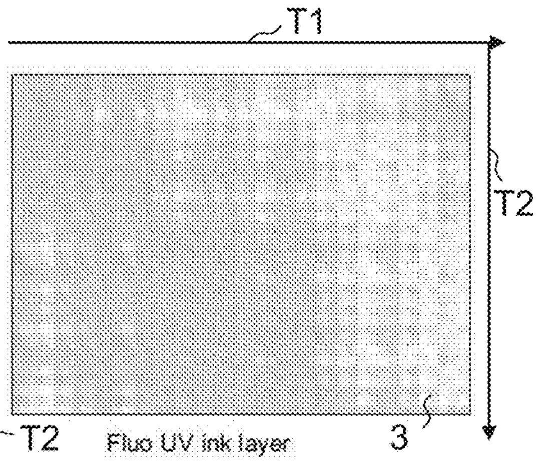
FIG. 8*b* depicts a top view on a fluorescent UV ink layer.
Figure 8C:
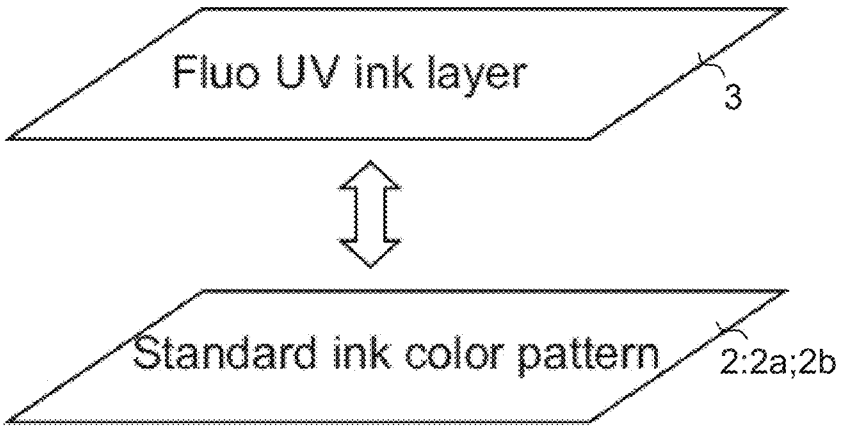
FIG. 8*c* depicts a schematics illustrating an arrangement of the layers according to FIGS. 8*a* and 8*b;*
Figure 8D:
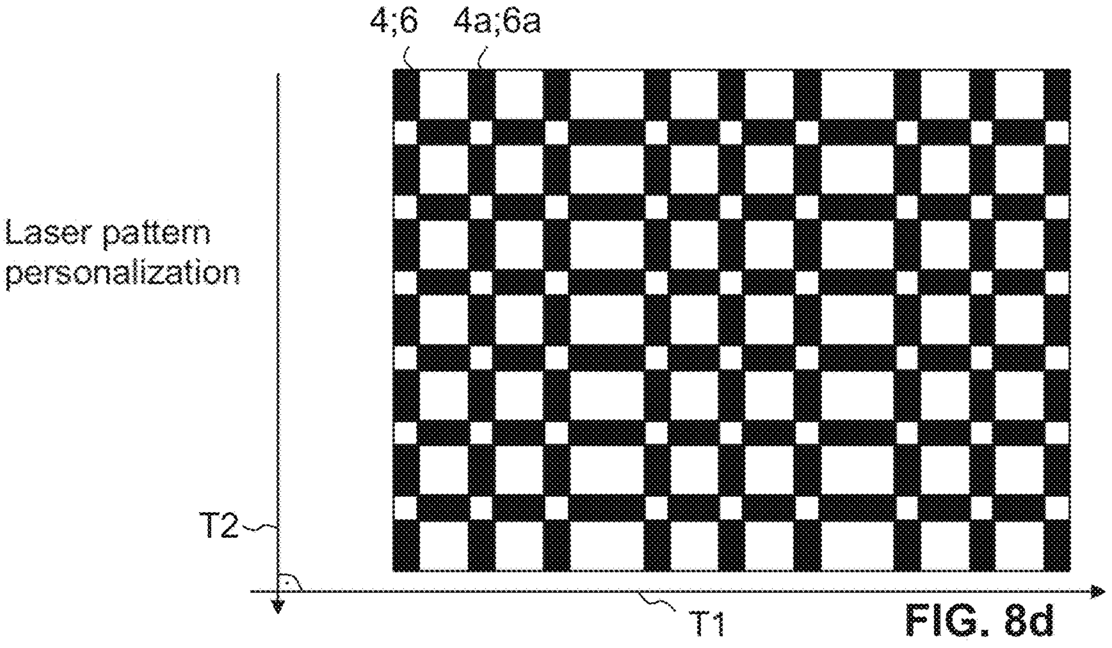
FIG. 8*d* depicts a schematics illustrating personalization elements in the form of opaque marks being arranged in a pattern.
Figure 8E:
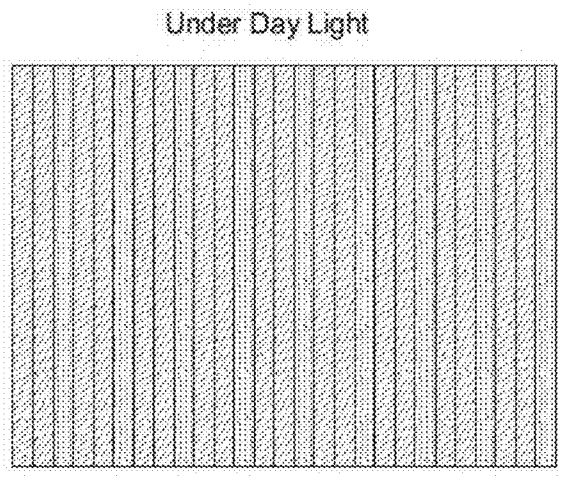
FIG. 8*e* depicts the arrangements according to FIGS. 8*c* and 8*d* and being personalized with personalization elements in the form of removed varnish when observed under day light.

For example, and as follows from FIGS. 8*a* to 8*c*, a data carrier 1 can comprise first colour elements 2, 2*a*, 2*b*, . . . in the form of a layered standard ink colour pattern comprising three different colours being arranged alternatingly and second colour elements 3, 3*a*, 3*b*, . . . in the form of a layered fluorescent UV ink that are arranged above one another with respect to the extension direction E. In fact, in the depicted example the fluorescent UV ink layer is arranged before the standard ink colour pattern, see FIG. 8*c*. Although not depicted in these figures, processing elements 5, 8 in the form of a varnish and a C-doped layer are present as well. Furthermore, and as follow from FIG. 8*d*, a particular laser personalization pattern is applied. Said laser personalization pattern is constituted here by opaque marks that are generated in the C-doped layer and/or removed varnish.

Figure 8F:
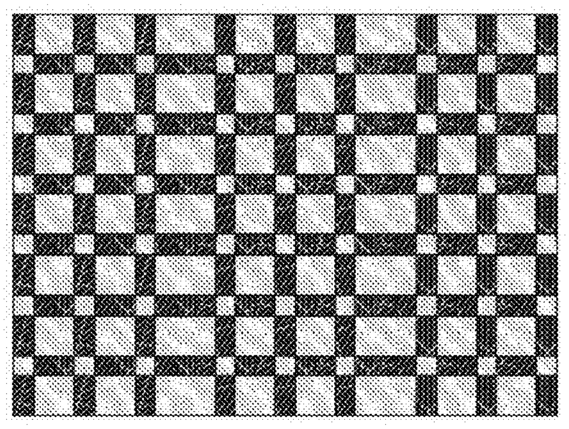
FIG. 8*f* depicts the arrangement according to FIGS. 8*c* and 8*d* and being personalized with personalization elements in the form of removed varnish when observed under ultraviolet light.
Figure 8G:
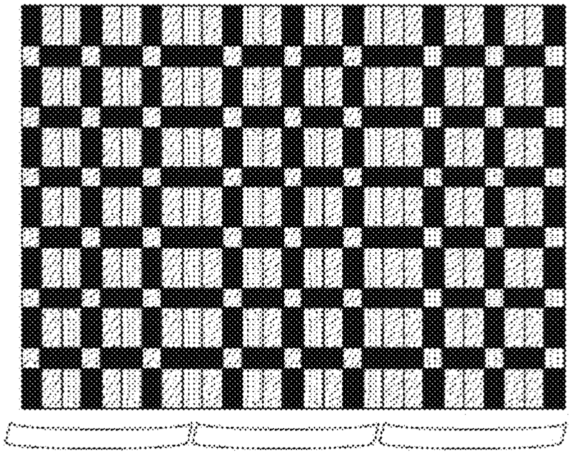
FIG. 8*g* depicts the arrangement according to FIG. 8*e* and being further personalized with personalization elements in the form of opaque marks and removed varnish when observed under day light.
Figure 8H:
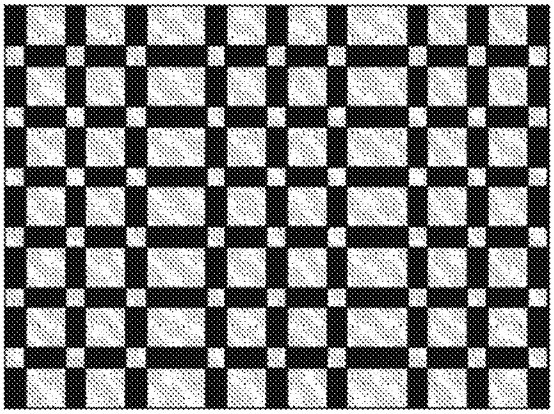
FIG. 8*h* depicts the arrangement according to FIG. 8*f* and being further personalized with personalization elements in the form of opaque marks and removed varnish when observed under ultraviolet light.
Figure 8I:
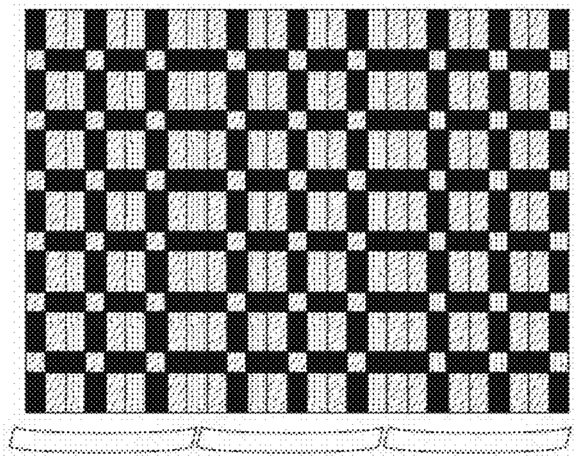
FIG. 8*i* depicts the arrangement according to FIGS. 8*c* and 8*d* with personalization elements in the form of opaque marks between the standard ink and the Fluo UV ink layers when observed under daylight light.
Figure 8J:
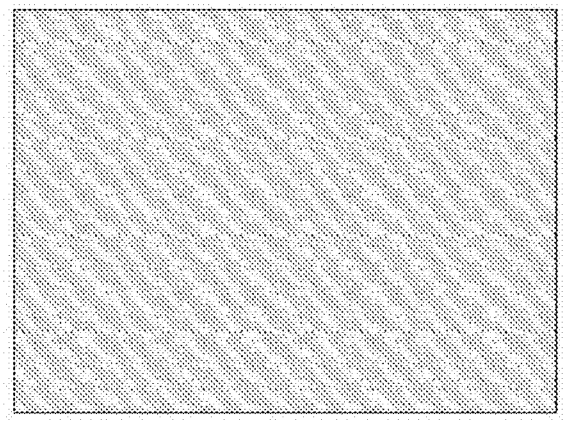
FIG. 8*j* depicts the arrangement according to FIGS. 8*c* and 8*d* with personalization elements in the form of opaque marks between the standard ink and the Fluo UV ink layers when observed under ultraviolet light.

These elements allow different types of personalizations. Namely, in a first type of personalization, and as follows from FIGS. 8*e* and 8*f*, a first laser setting could be used to selectively remove the varnish. In other words, the fluorescent UV ink is selectively bleached. As a consequence, only the standard ink pattern is visible when the data carrier 1 is observed under daylight (FIG. 8*e*), and the opaque marks at the locations of the removed varnish and the fluorescent UV ink at locations where the varnish is still present is visible when the data carrier 1 is observed under UV light (FIG. 8*f*). In a second type of personalization as depicted in FIGS. 8*g* and 8*h*, the varnish is selectively removed, i.e. the fluorescent UV ink is selectively bleached, and opaque markings are generated inside the C-doped layer. Consequently, when the data carrier 1 is observed under daylight (see FIG. 8*g*), opaque markings as well as standard ink colours at locations without opaque markings are visible. When the data carrier 1 is observed under UV light (see FIG. 8*h*), opaque markings are visible at locations where the varnish has been removed and fluorescent UV ink is visible at locations where the varnish has not been removed. In a third type of personalization as depicted in FIGS. 8*i* and 8*j* the varnish is not removed, i.e. the fluorescent UV ink is not bleached. Instead, only opaque marks are generated in the C-doped layer. Hence, when the data carrier 1 is observed under daylight (FIG. 8*i*), opaque marks and standard ink colour at locations without opaque marks are visible. When the data carrier 1 is observed under UV light, only the fluorescent UV ink is visible (FIG. 8*j*).

As will be discussed with reference to FIGS. 9*a* to 9*n*, the first colour elements 2, 2*a*, 2*b*, . . . , the second colour elements 3, 3*a*, 3*b*, . . . and the personalization elements 4, 4*a*, . . . 6, 6*a*, . . . , can be aligned according to selected alignments A, A1, . . . with respect to one another, with respect to the extension direction E, and with respect to the transverse directions T1; T2 extending perpendicularly to the extension direction E, respectively.

In fact, the provision of first colour elements 2, 2*a*, 2*b*, . . . , second colour elements 3, 3*a*, 3*b*, . . . and personalization elements 4, 4*a*, . . . 6, 6*a*, . . . that are aligned according to different alignments A, A1, . . . allows the generation of a security element 7 that exhibits different appearances such as different colour impressions and/or different spatial impressions depending on the illumination condition of the data carrier 1. This effect shall now be illustrated with the concrete examples presented in FIGS. 9*a* to 9*n*.

As follows from FIGS. 9*a* and 9*b*, the first colour elements 2, 2*a*, 2*b*, . . . are provided in the form of a layered standard ink colour pattern comprising three different standard ink colours being alternatingly arranged and in the form of a layered fluorescent UV ink pattern comprising three different fluorescent UV ink colours being alternatingly arranged as well. In fact, the patterns are in each case constituted by lines of different colours, and wherein the lines of the standard ink colour pattern run perpendicular to the lines of the fluorescent UV ink colour pattern.

Figure 9C:
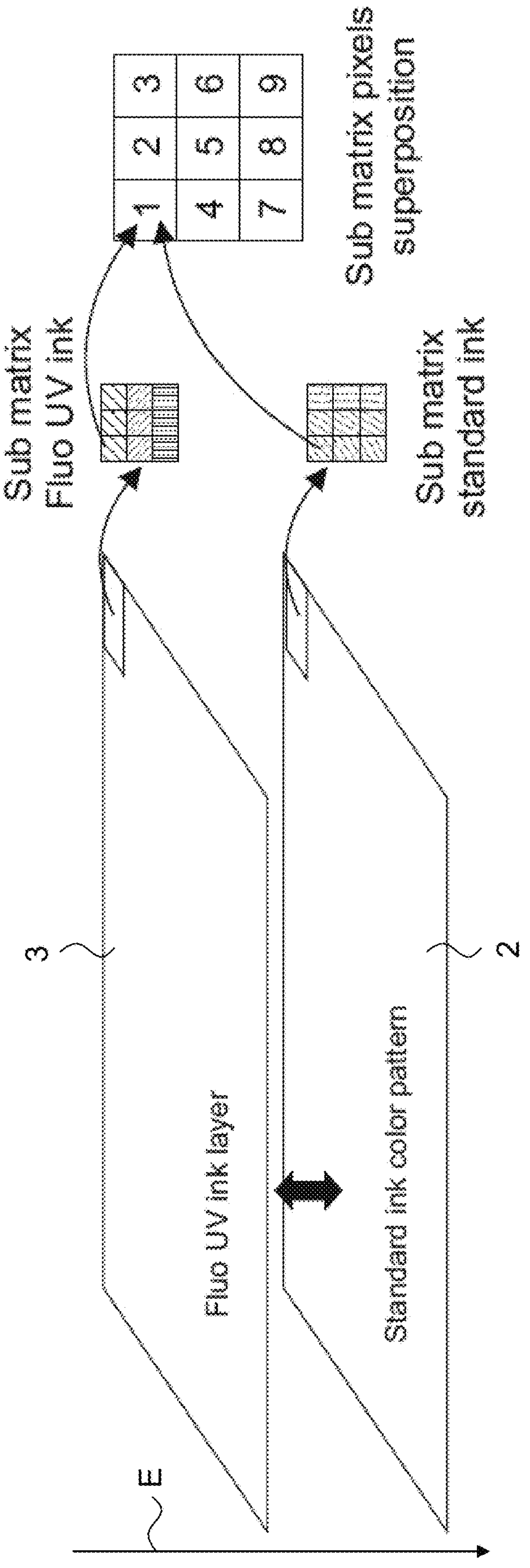
FIG. 9*c* depicts a schematics illustrating an arrangement of pixelated layers of fluorescent UV ink and standard colour ink, wherein nine pixels are illustratively aligned.

The fluorescent UV ink layer is arranged before the standard ink colour layer with respect to the extension direction E, see FIG. 9*c*. Furthermore, and as also follows from FIG. 9*c*, the individual colours of the two different layers are defined as pixels. In fact, for illustrative purposes it is shown that e.g. 3×3 pixels of the fluorescent UV ink layer can constitute a sub matrix of fluorescent UV ink that is arranged congruent with 3×3 pixels of the standard ink colour layer. The 9 pixels of the fluorescent UV ink layer and their congruent 9 pixels of the standard ink colour layer can be said to form a sub matrix pixels superposition. For example, the sub matrix of the fluorescent UV ink representing the second colour elements 3, 3*a*, 3*b*, . . . could be made by horizontal lines consisting of a first line in Red, a second line in Green, a third line in Blue, and so on, whereby the elements of the sub matrix 1,2,3 are Red, the elements 4,5,6 are Green, and the elements 7,8,9 are Blue. Moreover, the sub matrix of the standard ink colour representing the first colour elements 2, 2*a*, 2*b*, . . . could be made by vertical lines consisting of a first line in Yellow, a second line in Magenta, a third line Cyan, and so on, whereby the elements of the sub matrix 1,4,7 are Yellow, the elements 2,5,8 are Magenta, and the elements 3,6,9 are Cyan.

Figure 9D:
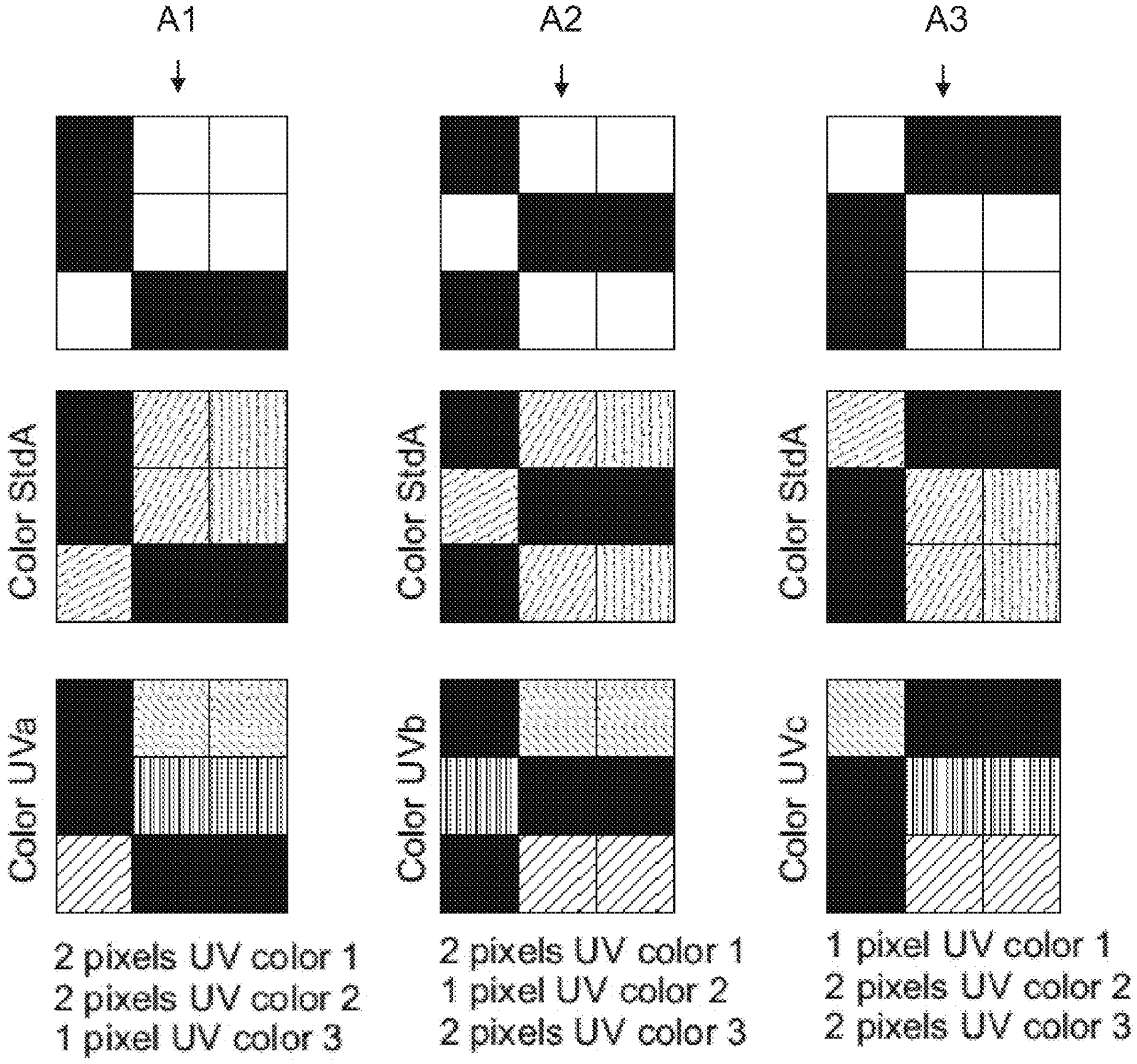
FIG. 9*d* depicts conceivable alignments of the pixels according to FIG. 9*c*, wherein selected pixels are personalized by pixelated personalization elements.
Figure 9E:
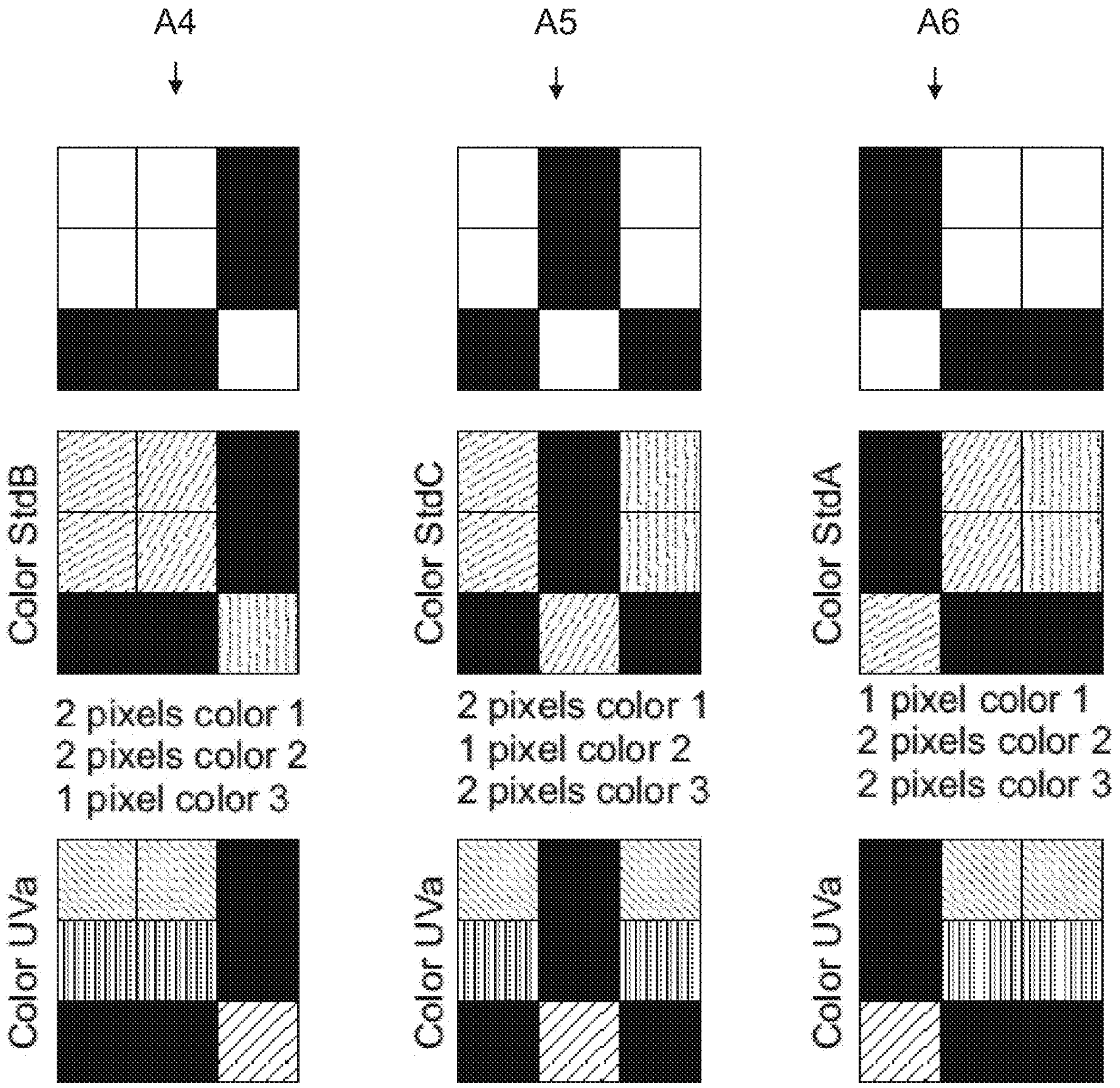
FIG. 9*e* depicts other conceivable alignments of the pixels according to FIG. 9*c*, wherein selected pixels are personalized by pixelated personalization elements.

FIGS. 9*d* to 9*e* depict different conceivable alignments A, A1, . . . of these pixels, wherein selected pixels are personalized by pixelated personalization elements 4, 4*a*, . . . 6, 6*a*, . . . . As a result, different appearances are generated when observed under daylight and under UV light, see FIGS. 9*f* to 9*n*. Here, the personalization of the data carrier 1, i.e. the provision of selected personalization elements 4, 4*a*, . . . 6, 6*a*, . . . being represented here by the black squares, corresponds to a selected bleaching or removal of the fluorescent UV ink and a selected blocking or hiding of the standard ink colour by an opaque mark over it according to particular alignments.

In particular, FIGS. 9*d* and 9*e* in each case depict black squares, wherein each black square represents a personalization of one colour element of the sub matrix being constituted by the pixels as just described.

Using the alignments A1, A2 or A3 of FIG. 9*d*, the same global color of the submatrix is obtained. For example, assuming that the Color Standard A corresponds to blue offset, said colour is achieved with 1 pixel of Yellow+2 pixels of Magenta+2 pixels of Cyan+4 pixels of Black. As a consequence, Color Standard A is visible under day light, but not under UV light. Using the alignment A1 the global color of the submatrix under UV light corresponds to Yellow, which is constituted by 2 pixels of Red+2 pixels of Green+1 pixel of Blue+4 pixels of Black=Color UV a. Using the alignment A2 the global color of the submatrix under UV light corresponds to Magenta, which is constituted by 2 pixels of Red+1 pixel of Green+2 pixels of Blue+4 pixels of Black=Color UV b. Using the alignment A3 the global color of the submatrix under UV light corresponds to Cyan, which is constituted by 1 pixel of Red+2 pixels of Green+2 pixels of Blue+4 pixels of Black=Color UV c. The Color UV a and the Color UV b and the Color UV c are not visible under day light, i.e. they appear transparent, but instead are visible under UV light.

Likewise, alignments A4, A5, and A6 in FIG. 9*e* represent three different type of personalizations. It should be noted that the alignment A6 corresponds to the alignment A1 of FIG. 9*d*. Using the alignment A4 the global color of the submatrix corresponds to Standard Red, which is constituted by 2 pixels of Yellow+2 pixels of Magenta+1 pixel of Cyan+4 pixels of Black=Color Standard B. Using the alignment A5 the global color of the submatrix corresponds to Standard Green, which is constituted by 2 pixels of Yellow+1 pixel of Magenta+2 pixels of Cyan+4 pixels of Black=Color Standard C. Using the alignment A6 the global color of the submatrix corresponds to Standard Blue, which is constituted by 1 pixel of Yellow+2 pixels of Magenta+2 pixels of Cyan+4 pixels of Black=Color Standard A (same as A1, i.e. A6=A1). The Color Standard A and the Color Standard B and the Color Standard C are visible under day light but are not visible under UV light. Using the alignment A4 or A5 or A6 the same global color of the submatrix, for example UV Yellow being constituted by 2 pixels of Red+2 pixels of Green+1 pixel of Blue+4 pixels of Black is formed, which corresponds here to Color UV a. The Color UV a is not visible under day light, but instead is visible under UV Light.

Figure 9F:
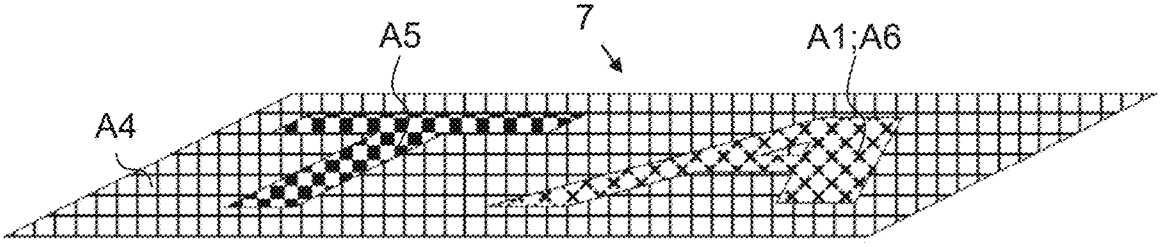
FIG. 9*f* depicts a security element of a data carrier comprising first colour elements, second colour elements and personalization elements being aligned according to particular alignments.

FIG. 9*f* represents a security element 7 in the form of characters "T" and "A" that is generated with particular personalizations as just described. In particular, the background out of the character shape corresponds to the personalisation being achieved with the alignment A4. The T character shape is achieved with the personalization A5, and the A character shape is achieved with the personalization A1 or A6.

Figure 9G:
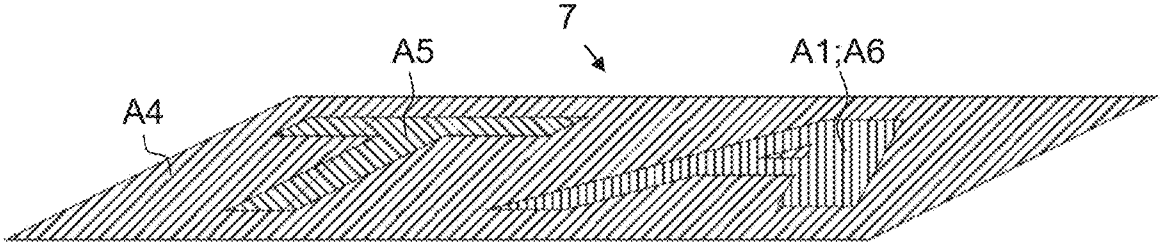
FIG. 9*g* depicts the data carrier comprising the security element according to FIG. 9*f* when observed under daylight.

FIG. 9*g* depicts the data carrier 1 comprising the security element 7 in the form of the characters "T" and "A" when observed under day light. The background, which is generated by the alignment A4, corresponds to the colour Red. The character T, which is generated by the alignment A5, corresponds to the colour Green. The character A, which is generated by the alignment A1 or A6, corresponds to the colour Blue. The characters will appear, i.e. be visible to or recognizable by the observer, in colour over the Red background.

Figure 9H:
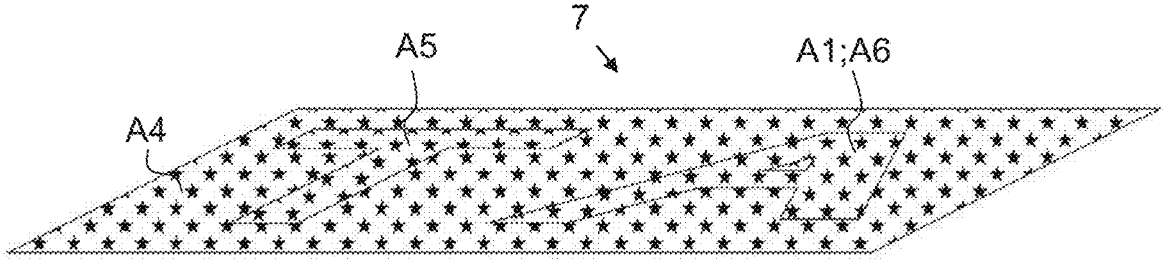
FIG. 9*h* depicts the data carrier comprising the security element according to FIG. 9*f* when observed under ultraviolet light.

FIG. 9*h* depicts the data carrier 1 comprising the security element 7 in the form of the characters "T" and "A" when observed under UV light. The background, which is generated by the alignment A4, corresponds to the colour Yellow. The character T, which is generated by the alignment A5, corresponds to the colour Yellow. The character A, which is generated by the alignment A1 or A6, corresponds to the colour Yellow. Since the characters appear with the same colour as the background, the characters will not appear, i.e. be invisible or not recognizable by the observer.

Figure 9I:
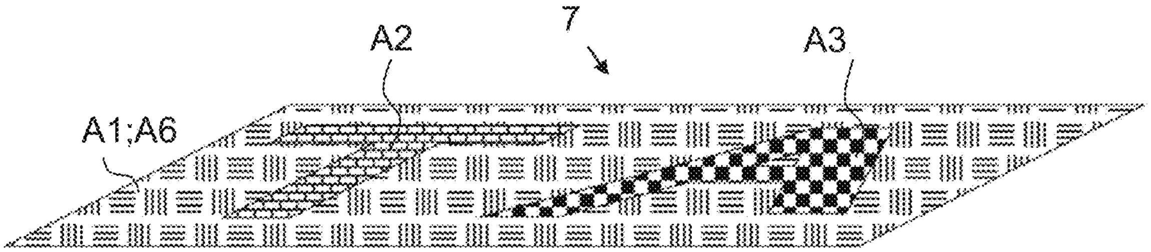
FIG. 9*i* depicts another security element of a data carrier comprising first colour elements, second colour elements and personalization elements being aligned according to particular alignments.

FIG. 9*i* represents a security element 7 in the form of characters "A" and "T" that is generated with particular personalizations as just described. In particular, the background out of the character shape corresponds to the personalisation being achieved with the alignment A1 or A6. The character T corresponds to the personalization being achieved with the alignment A2. The character A corresponds to the personalization being achieved with the alignment A3.

Figure 9K:
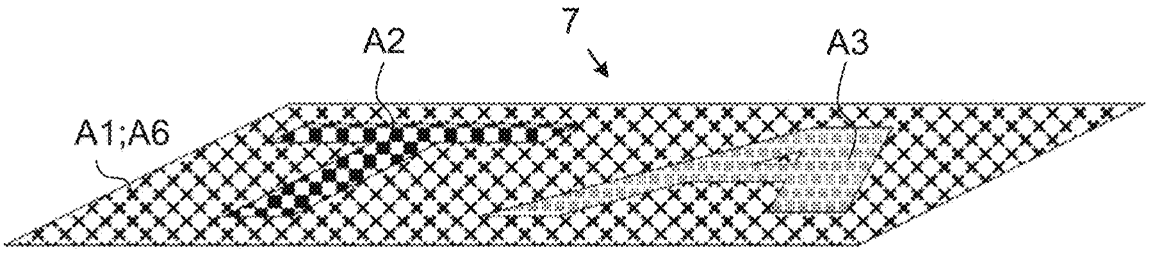
FIG. 9*k* depicts the security element according to FIG. 9*i* when observed under ultraviolet light.
Figure 9J:
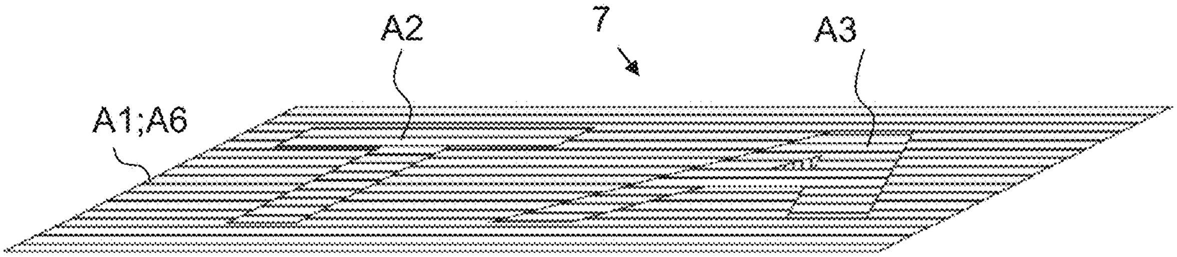
FIG. 9*j* depicts the security element according to FIG. 9*i* when observed under daylight.

FIG. 9*j* depicts the data carrier 1 comprising the security element 7 in the form of the characters "T" and "A" when observed under day light. The background, which is generated by the alignment A1 or A6, corresponds to the colour Blue. The character T, which is generated by the alignment A2, corresponds to the colour Blue. The character A, which is generated by the alignment A3, corresponds to the colour Blue. Since the characters appear with the same colour as the background, the characters will not appear, i.e. be invisible or not recognizable by the observer.

FIG. 9*k* depicts the data carrier 1 comprising the security element 7 in the form of the characters "T" and "A" when observed under UV light. The background, which is generated by the alignment A1 or A6, corresponds to the colour Yellow. The character T, which is generated by the alignment A2, corresponds to the colour Magenta. The character A, which is generated by the alignment A3, corresponds to the colour Cyan. The characters will appear, i.e. be visible to or recognizable by the observer, in colour over the Yellow background.

Figure 9M:
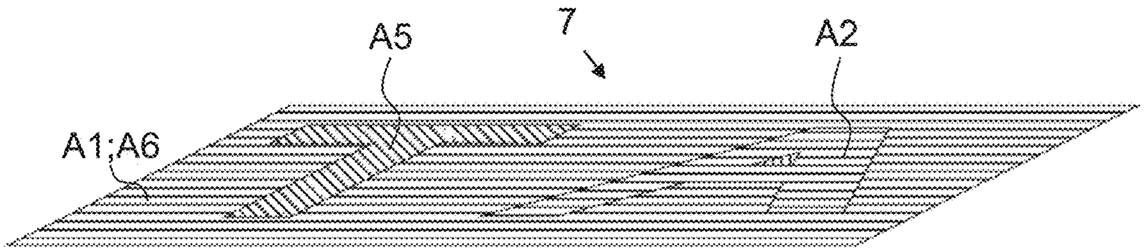
FIG. 9*m* depicts the security element according to FIG. 9*l* when observed under daylight.
Figure 9L:
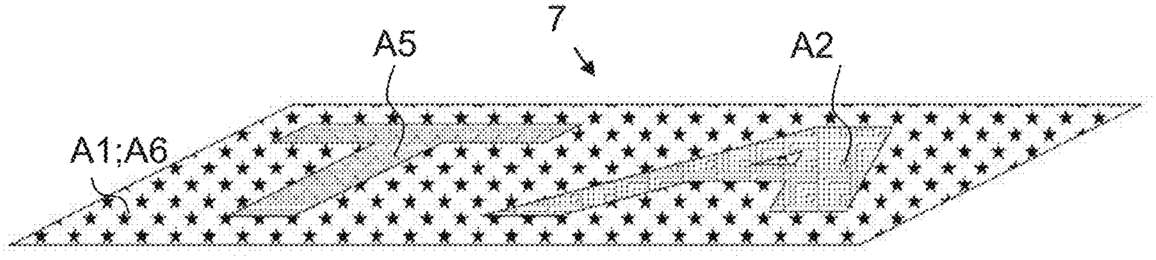
FIG. 9*l* depicts another security element of a data carrier comprising first colour elements, second colour elements and personalization elements being aligned according to particular alignment.

FIG. 9*l* represents a security element 7 in the form of characters "A" and "T" that is generated with particular personalizations as just described. In particular, the background out of the character shape corresponds to the personalisation being achieved with the alignment A1 or A6. The character T corresponds to the personalization being achieved with the alignment A5. The character A corresponds to the personalization being achieved with the alignment A2.

FIG. 9*m* depicts the data carrier 1 comprising the security element 7 in the form of the characters "T" and "A" when observed under day light. The background, which is generated by the alignment A1 or A6, corresponds to the colour Blue. The character T, which is generated by the alignment A5, corresponds to the colour Green. The character A, which is generated by the alignment A2, corresponds to the colour Blue. The character "T" will appear, i.e. be visible to or recognizable by the observer, in Green colour over the Blue background.

Figure 9N:
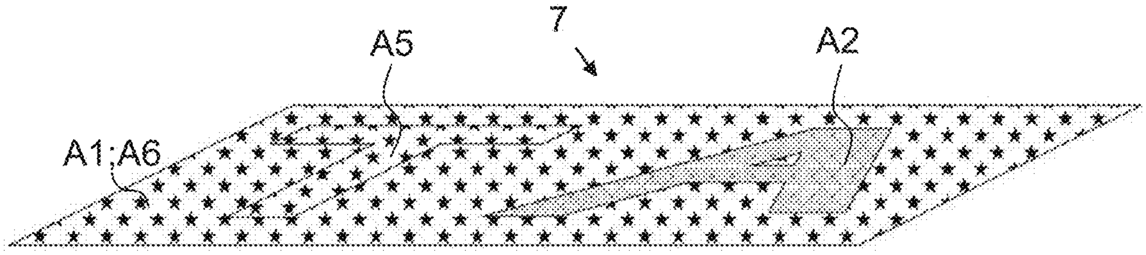
FIG. 9*n* depicts the security element according to FIG. 9*l* when observed under ultraviolet light.

FIG. 9*n* depicts the data carrier 1 comprising the security element 7 in the form of the characters "T" and "A" when observed under UV light. The background, which is generated by the alignment A1 or A6, corresponds to the colour Yellow. The character T, which is generated by the alignment A5, corresponds to the colour Yellow. The character A, which is generated by the alignment A2, corresponds to the colour Magenta. The character A will appear, i.e. be visible to or recognizable by the observer, in Magenta colour over the Yellow background.

| LIST OF REFERENCE SIGNS | |
|---|---|
| 1 | data carrier |
| 2, 2a, . . . | first colour element |
| 3, 3a, . . . | second colour element |
| 4, 4a, . . . | personalization element |
| 5 | processing element |
| 6 | personalization element |
| 7 | security element |
| 8 | processing element |
| 9 | transparent layer |
| 10 | card body |
| E | extension direction |
| T1 | transverse direction |
| T2 | transverse direction |
| R | electromagnetic radiation |
| A, A1, . . . | alignment |

The invention claimed is:

1. A data carrier extending along an extension direction (E) and comprising:

at least one first colour element, wherein the first colour element exhibits an appearance under a first illumination and/or exhibits an appearance under a second illumination being different from the first illumination;

at least one second colour element, wherein the second colour element exhibits an appearance under the first illumination being different from the appearance of the first colour element under the first illumination and/or exhibits an appearance under the second illumination that is different from the appearance of the first colour element under the second illumination;

at least one personalization element, and at least one security element, wherein the first colour element and the second colour element are arranged staggered along the extension direction (E), wherein the security element at least partially comprises the first colour element, the second colour element and the personalization element, and wherein the security element exhibits a first appearance under the first illumination and a second appearance being different from the first appearance under the second illumination, wherein the personalization element is generated from a processing element, and wherein the processing element corresponds to a C-doped layer and/or to one or more polymers and/or to thermal ink, and wherein the personalization element corresponds to an opaque mark, or wherein the processing element corresponds to one or more pigments, and wherein the personalization element corresponds to a bleaching, or wherein the processing element corresponds to thermochromic ink and/or photochromic ink, and wherein the personalization element corresponds to a colour change, or wherein the processing element corresponds to one or more pigments and/or photochromic ink and/or thermochromic ink, and wherein the personalization element corresponds to a transparency change, or wherein the processing element corresponds to a varnish and/or ink with one or more metallic particles that are ablated upon irradiation with electromagnetic radiation (R), and wherein the personalization element corresponds to an ablation.

2. The data carrier according to claim 1, wherein the personalization element is arranged to affect at least one of the first colour element, the second colour element, the appearance of the first colour element under the first illumination, the appearance of the first colour element under the second illumination, or the appearance of the second colour element under the second illumination.

3. The data carrier according to claim 1, wherein the personalization element is at least partially overlapping and/or arranged at least partially offset to the first colour element and/or the second colour element along the extension direction (E), and/or wherein the personalization element is at least partially overlapping and/or arranged at least partially offset to the first colour element and/or the second colour element along at least a transverse direction (T1; T2) extending perpendicularly to the extension direction (E).

4. The data carrier according to claim 1, wherein the first colour element is arranged before the second colour element along the extension direction (E), and wherein the personalization element is arranged before the first colour element or between the first and second colour element or after the second colour element along the extension direction (E), or wherein the second colour element is arranged before the first colour element along the extension direction (E), and wherein the personalization element is arranged before the second colour element or between the second and first colour element or after the first colour element along the extension direction (E).

5. The data carrier according to claim 1, wherein the processing element alters an appearance of said processing element upon irradiation of electromagnetic radiation (R), whereby the personalization element is generated at a location of the irradiation, or wherein the processing element is removed upon irradiation of electromagnetic radiation (R), whereby the personalization element is generated at the location of the irradiation.

6. The data carrier according to claim 1, wherein the first colour element comprises ink, and/or wherein the first colour element comprises or consists of a fluorescent ink, and/or wherein the second colour element comprises or consists of a fluorescent ink, and/or wherein the security element has a shape of an image and/or of an alphanumeric character.

7. The data carrier according to any one of the preceding claims, wherein the first colour element and the second colour element are arranged at a distance from one another along the extension direction (E), or wherein the first colour element and the second colour element are arranged immediately adjacent to one another along the extension direction (E).

8. The data carrier according to claim 1, further comprising one or more further first colour elements (2*a*, 2*b*, . . . ), wherein said one or more further first colour elements (2*a*, 2*b*, . . . ) are arranged at least along a transverse direction (T1; T2) extending perpendicularly to the extension direction (E), and/or further comprising one or more further second colour elements (3*a*, 3*b*, . . . ), wherein said one or more further second colour elements (2*a*, 2*b*, . . . ) are arranged at least along a transverse direction (T1; T2) extending perpendicularly to the extension direction (E), and/or further comprising one or more further personalization elements (4*a*, 4*b*, . . . ; 6*a*, 6*b*, . . . ), wherein said one or more further personalization elements (4*a*, 4*b*, . . . ; 6*a*, 6*b*, . . . ) are arranged at least along a transverse direction (T1; T2) extending perpendicularly to the extension direction (E).

9. The data carrier according to claim 8, wherein the first colour elements are arranged as a pixelated pattern comprising or consisting of pixelated first colour elements and/or wherein the second colour elements are arranged as a pattern, and/or wherein the personalization elements are arranged as a pixelated pattern comprising or consisting of pixelated personalization elements.

10. The data carrier according to claim 1, wherein at least one first colour element and/or at least one second colour element (3) and/or at least one personalization element are aligned according to a selected alignment (A) with respect to one another and along the extension direction (E) and/or along a transverse direction (T1; T2) extending perpendicularly to the extension direction (E).

11. The data carrier according to claim 10, wherein at least one first colour element and/or at least one second colour element and/or at least one personalization element are aligned with respect to one another and along the extension direction (E) and/or along the transverse direction (T1; T2) according to a further selected alignment (A1, A2, . . . ).

12. A security document comprising or consisting of a data carrier according to claim 1.

13. A method of producing a data carrier extending along an extension direction (E), the method comprising the steps of:

providing at least one first colour element, wherein the first colour element exhibits an appearance under a first illumination and/or exhibits an appearance under a second illumination being different from the first illumination;

providing at least one second colour element, wherein the second colour element exhibits an appearance under the first illumination being different from the appearance of the first colour element under the first illumination and/or exhibits an appearance under the second illumination that is different from the appearance of the first colour element under the second illumination;

providing at least one personalization element, and providing at least one security element, wherein the first colour element and the second colour element are arranged staggered with respect to one another and along the extension direction (E), wherein the security element at least partially comprises the first colour element, the second colour element and the personalization element, and wherein the security element exhibits a first appearance under the first illumination and a second appearance being different from the first appearance under the second illumination, wherein the personalization element is generated from a processing element, and wherein the processing element corresponds to a C-doped layer and/or to one or more polymers and/or to thermal ink, and wherein the personalization element corresponds to an opaque mark, or wherein the processing element corresponds to one or more pigments, and wherein the personalization element corresponds to a bleaching, or wherein the processing element corresponds to thermochromic ink and/or photochromic ink, and wherein the personalization element corresponds to a colour change, or wherein the processing element corresponds to one or more pigments and/or photochromic ink and/or thermochromic ink, and wherein the personalization element corresponds to a transparency change, or wherein the processing element corresponds to a varnish and/or ink with one or more metallic particles that are ablated upon irradiation with electromagnetic radiation (R), and wherein the personalization element corresponds to an ablation.

14. The method according to claim 13, wherein the personalization element is generated by an irradiating electromagnetic radiation (R) onto the data carrier.

* * * * *